US005693913A

United States Patent [19]
Sudo et al.

[11] Patent Number: 5,693,913
[45] Date of Patent: Dec. 2, 1997

[54] COORDINATE READER AND METHOD OF DETECTING COORDINATES

[75] Inventors: Shuzo Sudo; Hideki Kitajima; Yasuyuki Mitsuoka; Susumu Fujita, all of Chiba, Japan

[73] Assignee: Seiko Instruments Inc., Japan

[21] Appl. No.: 437,550

[22] Filed: May 9, 1995

[30] Foreign Application Priority Data

May 13, 1994 [JP] Japan ................................ 6-100260
Feb. 24, 1995 [JP] Japan ................................ 7-037290

[51] Int. Cl.$^6$ .................................................. G08C 21/00
[52] U.S. Cl. ............................................................. 178/19
[58] Field of Search ............................ 178/18, 19, 20; 345/156, 157, 173, 174; 341/5

[56] References Cited

U.S. PATENT DOCUMENTS

| | | | |
|---|---|---|---|
| 5,120,907 | 6/1992 | Shinbori et al. | 178/19 |
| 5,128,499 | 7/1992 | Morita | 178/19 |
| 5,434,372 | 7/1995 | Lin | 178/19 |
| 5,557,076 | 9/1996 | Wiezorek et al. | 178/19 |
| 5,567,920 | 10/1996 | Watanabe et al. | 178/19 |

Primary Examiner—Curtis Kuntz
Assistant Examiner—Paul Loomis
Attorney, Agent, or Firm—Adams & Wilks

[57] ABSTRACT

A coordinate reader comprises a coordinate detector body having at least one excitation line, at least one detection line, an exciting circuit connected to the excitation line for supplying an exciting signal, a signal processing circuit connected to the detection line for receiving an induction signal generated in the detection line and outputting a signal containing amplitude information of the induction signal, and a control circuit for receiving the signal outputted by the signal processing unit and outputting an excitation control signal to the exciting circuit. A coordinate indicator indicates position information obtained from the induction signal induced in the detection line. A phase detecting circuit detects a phase difference between the excitation signal and the induction signal generated in the detection line. By this structure, an induction signal component due to the direct electromagnetic coupling between the excitation line and the detection line is eliminated, the required accuracy in calculation of the coordinates is ensured, and the read invalid region can be further reduced.

17 Claims, 31 Drawing Sheets

F I G. 1 1
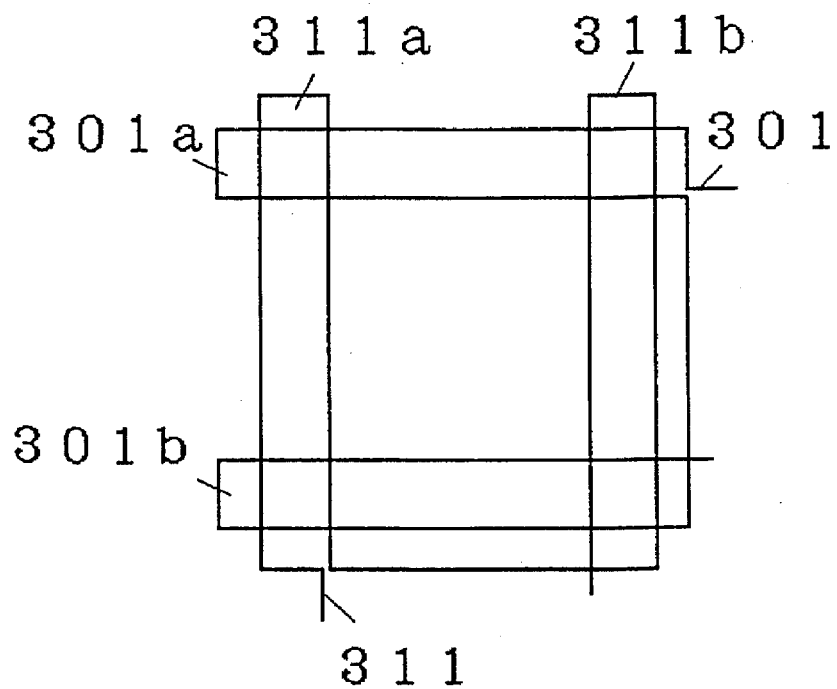
F I G. 1 2
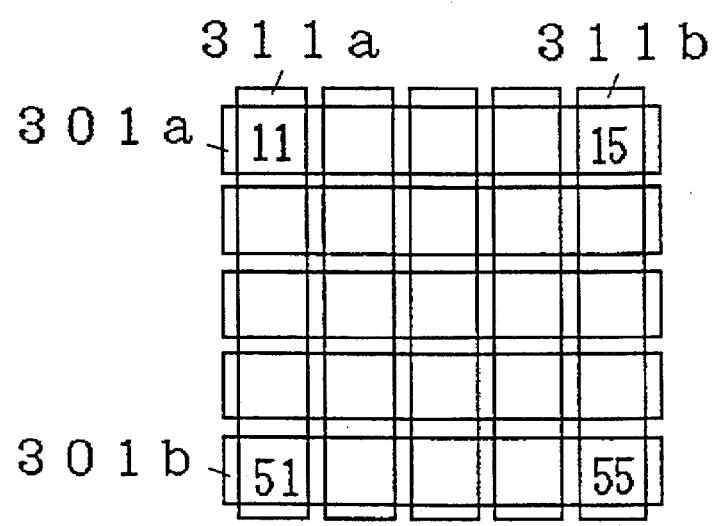

FIG. 23

|  | 611a | 612 | 613 | 614 | 611b |
|---|---|---|---|---|---|
| 601a | 0 | 0 | 0 | 0 | 1 |
| 602 | 0 | 0 | 0 | 0 | 1 |
| 603 | 0 | 0 | 0 | 0 | 1 |
| 604 | 0 | 0 | 0 | 0 | 1 |
| 601b | 1 | 1 | 1 | 1 | 0 |

FUNCTION TABLE OF FIRST SCANNING CIRCUIT 13a

| s31 | SELECTED SENSE LINE |
|---|---|
| 0 | 71 |
| 1 | 72 |
| 2 | 73 |

FIG. 27

FUNCTION TABLE OF SECOND SCANNING CIRCUIT 14a

| s32 | SELECTED SENSE LINE |
|---|---|
| 0 | 81 |
| 1 | 82 |
| 2 | 83 |
| 3 | 84 |

FIG. 28

FUNCTION TABLE OF PHASE CHANGE-OVER CIRCUIT 12a

| s33 | TERMINAL CONNECTED TO INPUT i3 |
|---|---|
| 0 | o1 |
| 1 | o2 |

FIG. 31

FUNCTION TABLE OF FIRST SCANNING CIRCUIT 13 b

| s31 | SELECTED SENSE LINE |
|---|---|
| 0 | 71 |
| 1 | 72 |
| 2 | 73 |
| 3 | 74 |

FIG. 32

FUNCTION TABLE OF SECOND SCANNING CIRCUIT 14 b

| s32 | SELECTED SENSE LINE |
|---|---|
| 0 | 81 |
| 1 | 82 |
| 2 | 83 |
| 3 | 84 |
| 4 | 85 |

FIG. 35

FUNCTION TABLE OF SECOND SCANNING CIRCUIT 14c

| s32 | SELECTED SENSE LINE |
|---|---|
| 0 | 81 |
| 1 | 82 |
| 2 | 83 |
| 3 | 84 |
| 4 | 85 |
| 5 | 81、85 |

FIG. 36

FUNCTION TABLE OF PHASE CHANGE-OVER CIRCUIT 12b

| s33 | TERMINAL CONNECTED TO INPUT i1 | TERMINAL CONNECTED TO INPUT i2 |
|---|---|---|
| 0 | o1 | o2 |
| 1 | o2 | o1 |

FIG. 37

TABLE REPRESENTING SENSE LINES SELECTED EVERY ADDRESS

| ADDRESS | s33 | s31 | s32 | SENSE LINE CONNECTED TO INVERTED INPUT OF AMPLIFYING CIRCUIT 6 | SENSE LINE CONNECTED TO NON-INVERTED INPUT OF AMPLIFYING CIRCUIT 6 | SENSE LINE CONNECTED TO OUTPUT OF AMPLIFYING CIRCUIT 6 |
|---|---|---|---|---|---|---|
| A | 0 | 0 | 0 | 81 | — | 71 |
| B | 1 | 0 | 4 | 85 | — | 71 |
| E | 0 | 2 | 5 | 81 | 85 | 73 |
| F | 1 | 2 | 5 | 85 | 81 | 73 |
| C | 1 | 0 | 0 | — | 81 | 71 |
| D | 0 | 0 | 4 | — | 85 | 71 |

FIG. 39

FUNCTION TABLE OF FIRST SCANNING CIRCUIT 13c

| s31 | SELECTED SENSE LINE |
|---|---|
| 0 | 71 |
| 1 | 72 |
| 2 | 73 |
| 3 | 71b |

FIG. 40

FUNCTION TABLE OF SECOND SCANNING CIRCUIT 14d

| s32 | SELECTED SENSE LINE |
|---|---|
| 0 | 81 |
| 1 | 82 |
| 2 | 83 |
| 3 | 82b |

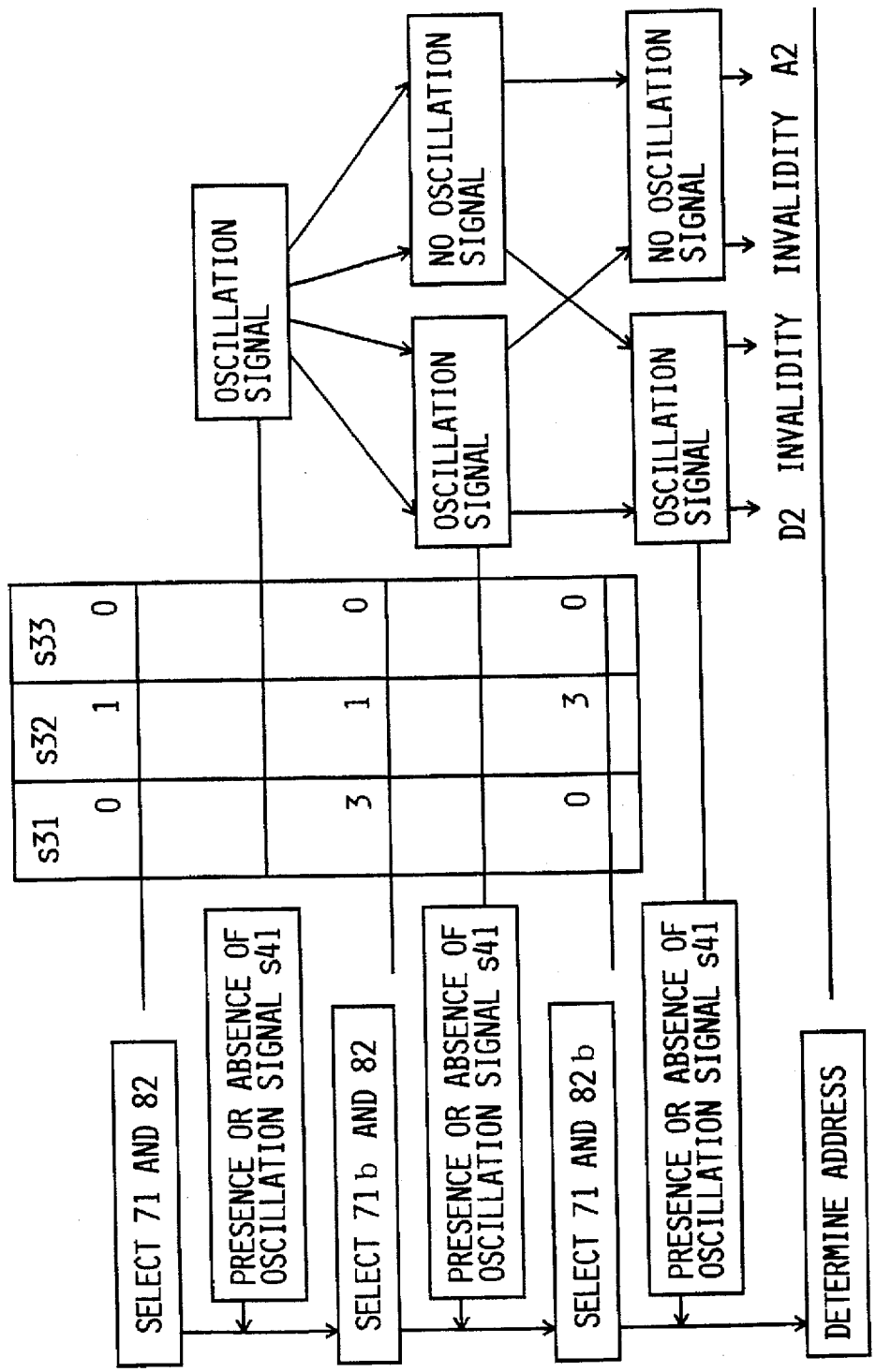

COORDINATE READER AND METHOD OF DETECTING COORDINATES

BACKGROUND OF THE INVENTION

Field of the Invention

The present invention relates to a coordinate reader for inputting position information to an external device such as a computer, and more particularly to a wireless coordinate reader requiring no connection between a coordinate detector body and a coordinate indicator through a signal conductor.

FIG. 21 shows a structural diagram of a conventional coordinate reader. A description will be given of an operation of detecting coordinates in accordance with the conventional coordinate reader With reference to FIG. 21.

An excitation line group represented by a plurality of excitation lines 911 and a detection line group represented by a plurality of detection lines 912 are constituted so as to be placed orthogonally to each other and connected to an excitation line scanning circuit 907 and a detection line scanning circuit 908, respectively, by which the excitation lines 911 and detection lines 912 are sequentially selected one by one. Since the excitation line scanning circuit 907 is supplied with an excitation signal s901 from an exciting circuit 901, a selected excitation line 911 generates an alternating magnetic field. A coordinate indicator 905 has a resonance circuit 906 which resonates at a frequency of the exciting signal s901. When the coordinate indicator 905 is allowed to approach a region where the excitation lines 911 and the detection lines 912 intersect, an induction signal s902 is generated from the detection line 912 due to electromagnetic coupling of the excitation line 911, the resonance circuit 906 and the detection line 912. The detection lines 912 are sequentially selected by the detection line scanning circuit 908, and the induction signal s902 leads to a signal processing circuit 902. An amplitude information s902 of the induction signal s902 generated from the signal processing circuit 902 is then inputted to a control circuit 904, thereby calculating coordinates from the amplitude distribution of the induction signal s902. The control circuit 904 also has a function of controlling the exciting circuit 901, the excitation line scanning circuit 907, and the detection line scanning circuit 908.

In the conventional coordinate reader, when the coordinate indicator 905 is apart from the region where the excitation lines 911 and the detection lines 912 intersect, the excitation line group and the detection line group are orthogonal to each other. Hence, basically, no induction signal s902 is generated directly from the detection line group by the alternating magnetic field generated from the excitation line group. However, for practical purposes, in the case where the excitation line or detection line in the periphery of the coordinate detector is selected, electromagnetic coupling is directly generated between the excitation line 911 and the detection line 912. As a result, there arises such a problem that the induction signal s902 is generated even if there exists no coordinate indicator 905.

FIG. 22 shows an explanatory diagram showing the state of induction developed by electromagnetic coupling between the excitation line group and the detection line group. Shown in FIG. 22 are one excitation line yk consisting of a q-r-s-t portion for developing a magnetic field and one detection line xk consisting of a u-v-w-x portion for detecting an induction signal, respectively. A mark indicating a direction of the magnetic field shown in the figure is that in the case where a current flows in the excitation line yk in the direction of q, r, s and t indicated by arrows. As shown in FIG. 22, all of distances $1_{y1}$, $1_{y2}$ and distances $1_{x1}$, $1_{x2}$ are sufficiently long, a sum of the number of cross magnetic flux is substantially zero even if a magnetic field is generated from the excitation line yk. As a result, no induction is caused by the magnetic field developed by the excitation line yk. However, if any one of the distances $1_{y1}$, $1_{y2}$ and distances $1_{x1}$, $1_{x2}$ is short, conditions under which the number of cross magnetic flux is zero are not satisfied. For example, in FIG. 22, in the case where the distance $1_{y1}$ is short, a portion where a magnetic field indicated upwardly from a q-r part (a magnetic field directed from the front side to the back side of a paper), of the magnetic field developed by the excitation line yk, is not cross to the detection line xk is increased. Also, in the case where the distance $1_{x1}$ is short, a magnetic field developed from the r-s part of the excitation line yk (a magnetic field directed from the back side to the front side of the paper) influences the coordinate reader. Accordingly, when any one of the distances $1_{y1}$, $1_{y2}$ and distances $1_{x1}$, $1_{x2}$ is short, the number of cross magnetic flux does not result in zero, whereby the induction signal is generated from the detection line xk due to the magnetic field developed from the excitation line yk.

The strength of the electromagnetic coupling between the above-mentioned excitation line group and detection line group, that is, the mutual inductance is determined in accordance with the positional relationship of the selected excitation line yk and the selected detection line xy, that is, the combination thereof. The component of the induction signal resulting from that electromagnetic coupling is added to the induction signal s902 generated by using the coordinate indicator 905. This situation leads to such a problem that the accuracy in calculation of the coordinates is lowered at the peripheral portion of the coordinate detector in the coordinate calculating method in which the amplitude of the induction signal s902 is compared and obtained.

Conversely considering, in the conventional coordinate reader, for the purpose of ensuring a predetermined accuracy in detection of the coordinates, the excitation line yk and the detection line xk are placed such that the distances $1_{y1}$, $1_{y2}$, $1_{x1}$ or $1_{x2}$ (hereinafter referred to as a "distance of a return position in a sense line") is not shorter than a predetermined value, thereby reducing the electromagnetic coupling between the excitation ling group and the detection line group. As a result, there has arisen such a problem that the size of the coordinate detector is remarkably larger than the coordinate read region.

SUMMARY OF THE INVENTION

Therefore, in order to solve the above-mentioned problems with the conventional coordinate reader, an object of the present invention is to provide a wireless coordinate reader requiring no connection between a coordinate detector and a coordinate indicator through a signal conductor, in which the coordinate detector is not so larger than the coordinate read region, and which is capable of accurately detecting a position indicated by the coordinate indicator even in the peripheral portion of the coordinate detector.

In order to solve the above problems, according to a first aspect of the present invention, there is provided a coordinate reader which comprises a coordinate detector body including excitation lines placed in parallel with one axis of XY orthogonal coordinate axes in the form of a loop, detection lines placed in parallel with the other axis of the XY orthogonal coordinate axes in the form of a loop, an exciting circuit connected to said excitation lines for supplying an excitation signal, a signal processing circuit connected to said detection line, and a control circuit connected to said signal processing circuit, and a coordinate indicator including a resonance circuit, in which when said coordinate indicator is made to approach said excitation line and said detection line, position information indicated by said coordinate indicator is obtained from amplitude information of an induction signal induced by said detection line, wherein one line of said excitation lines and said detection lines includes a differential sense line having first and second loops connected in series which are placed so that the directions of both the loops are opposite to each other.

In order to solve the above problems, according to a second aspect of the present invention, there is provided a coordinate reader having the above-mentioned structure of the first aspect of the invention, which includes a phase detecting circuit for detecting a phase difference between said excitation signal and said induction signal in order to judge whether said coordinate indicator approaches said first loop or said second loop.

In order to solve the above problems, according to a third aspect of the present invention, there is provided a coordinate reader, comprising: a coordinate detector body including an amplifying circuit, a first sense line connected to an output of said amplifying circuit and placed in parallel with one axis of XY orthogonal coordinate axes in the form of a loop, a second sense line connected to an input of said amplifying circuit and placed in parallel with the other axis of said XY orthogonal coordinate axes in the form of a loop, a signal processing circuit, and a control circuit; and a coordinate indicator including a resonance circuit; in which, when said resonance circuit approaches said first and second sense lines so as to be electromagnetically coupled with said first and second sense lines, said amplifying circuit, said first and second sense lines, and said resonance circuit form an oscillating circuit of a positive feedback loop to generate an oscillation signal, and said signal processing circuit processes said oscillation signal to be converted into amplitude information, so that position information indicated by said coordinate indicator is obtained from said amplitude information through said control circuit, characterized in that at least one of said first sense line and said second sense line includes a differential sense line having first and second loops connected in series, the directions of which are opposite to each other.

In order to solve the above problems, according to a fourth aspect of the present invention, there is provided a coordinate reader having the above-mentioned structure of the third aspect of the invention, wherein a phase change-over circuit having a function of inverting a phase of said oscillation signal to judge whether said coordinate indicator approaches said first loop or said second loop is provided to an output or input of said amplifying circuit.

In order to solve the above problems, the coordinate reader according to the fourth aspect of the invention concretely comprises a coordinate reader, comprising: a coordinate detector body; and a coordinate indicator including a resonance circuit; wherein said coordinate detector body includes a first sense line group formed by a plurality of sense lines which is in the form of a loop and placed in parallel with one axis of XY orthogonal coordinate axes, at least one of which is a differential sense line having first and second loops connected in series, the directions of which are opposite to each other; a second sense line group formed by a plurality of sense lines which is in the form of a loop and placed in parallel with the other axis of XY orthogonal coordinate axes, at least one of which is a differential sense line having first and second loops connected in series, the directions of which are opposite to each other; a first scanning circuit connected to said first sense line group for selecting one sense line from said first sense line group; a second scanning circuit connected to said second sense line group for selecting one sense line from said second sense line group; an amplifying circuit having an input and output connected to said first scanning circuit and said second scanning circuit, respectively; a signal processing circuit connected to the input or output of said amplifying circuit; a control circuit connected to said signal processing circuit; and a phase change-over circuit connected to the output or input of said amplifying circuit for changing over the phase of an input signal according to a signal from said control signal.

In order to solve the above problems, according to a fifth aspect of the invention, there is provided a coordinate reader having the above-mentioned structure of the fourth aspect of the invention, wherein one of the first sense line group and the second sense line group has two differential sense lines adjacent to each other and the other sense line group has one differential sense line.

A method of detecting coordinates for use in the coordinate reader having the above-mentioned fourth concrete structure and fifth structure, comprises the steps of: (1) one sense line of said first and second sense line groups is an address determined by a sense line which is not a differential sense line, an oscillation signal at an address adjacent to a first candidature address is detected, and when said oscillation signal is significant, said first candidature address is the address indicated by said coordinate indicator; (2) when said oscillation signal is not significant, one sense line of said first and second sense line groups is an address determined by a sense line which is not a differential sense line, an oscillation signal at an address adjacent to a second candidature address is detected, and when said oscillation signal is significant, said second candidature address is the address indicated by said coordinate indicator; and (3) when the oscillation signal in said steps (1) and (2) is not significant, said first and second candidature addresses are made invalid.

A method of detecting the coordinates using the coordinate reader with the above sixth structure, comprising the steps of: (1) classifying said four candidatures into first and second candidature groups in accordance with a control signal supplied to said phase change-over circuit when said maximum oscillation signal is obtained; (2) selecting said discrimination sense line and a differential sense line of the sense line group having no discrimination sense line, and detecting the presence or absence of the oscillation signal at that time; and (3) specifying the address indicated by said coordinate indicator in accordance with the presence or absence of said oscillation signal, information on whether the candidature is classified into said first or second group, or a control signal supplied to said phase change-over circuit when the oscillation signal is obtained at this step.

In order to solve the above problems, according to a seventh aspect of the present invention, there is provided a coordinate reader which comprises: a coordinate detector body; and a coordinate indicator including a resonance circuit; said coordinate detector body including a first sense line group formed by a plurality of sense lines which is in the form of a loop and placed in parallel with one axis of XY orthogonal coordinate axes; a second sense line group formed by a plurality of sense lines which is in the form of a loop and placed in parallel with the other axis of XY orthogonal coordinate axes, at least one of which is a differential sense line having first and second loops connected in series, the directions of which are opposite to each other; a first scanning circuit connected to said first sense line group for selecting one sense line from said first sense line group, or said one sense line and one sense line from the remainder simultaneously; a second scanning circuit connected to said second sense line group for selecting one sense line from said second sense line group; an amplifying circuit having an inverse input terminal and a non-inverse input terminal and having an input and an output connected to said first scanning circuit and said second scanning circuit, respectively; a signal processing circuit connected to the input or output of said amplifying circuit; a control circuit connected to said signal processing circuit; and a phase change-over circuit for controlling to which of the inverse input terminal and non-inverse input terminal of said amplifying circuit one or two sense lines selected by said first scanning circuit are inputted.

In order to solve the above problems, according to an eighth aspect of the present invention, there is provided a coordinate reader which comprises: a coordinate detector body; and a coordinate indicator including a resonance circuit; said coordinate detector body including a first sense line group formed by a plurality of sense lines which is in the form of a loop and placed in parallel with one axis of XY orthogonal coordinate axes, at least one of which is a differential sense line having first and second loops connected in series, the directions of which are opposite to each other; a second sense line group formed by a plurality of sense lines which is in the form of a loop and placed in parallel with the other axis of XY orthogonal coordinate axes, at least one of which is a differential sense line having first and second loops connected in series, the directions of which are opposite to each other; a first scanning circuit connected to said first sense line group for selecting one sense line or loop from the respective sense lines of said first sense line group and one loop of the differential sense line of said first sense line group; a second scanning circuit connected to said second sense line group for selecting one sense line or loop from the respective sense lines of said second sense line group and one loop of the differential sense line of said second sense line group; an amplifying circuit having an output and input coupled to said first scanning circuit and said second scanning circuit, respectively; a signal processing circuit connected to the input or output of said amplifying circuit; a control circuit connected to said signal processing circuit; and a phase change-over circuit connected to the output or input of said amplifying circuit for changing over the phase of an input signal according to a signal from said control circuit.

According to the above first and second aspects of the invention, because the detection lines are connected so that the directions of the first loop and second loop of the detection lines are opposite to each other, when the coordinate indicator is apart from the region where the excitation line and the first and second loops of the detection line intersect, the induction signal component due to the direct electromagnetic coupling between the excitation line and the detection line is canceled. Of course, even when the excitation line is connected so that the directions of the first and second loops are opposite to each other, the induction signal component due to the direct electromagnetic coupling between the excitation line and the detection line is canceled.

Subsequently, when the coordinate indicator is made to approach the region where the excitation line and the first or second loop of the detection line intersect, the induction signal occurs in the detection line by the electromagnetic induction phenomenon among the excitation line, the resonance circuit and the detection line. The induction signal contains no induction signal component due to the direct electromagnetic coupling between the excitation loop and the detection loop, and the signal processing circuit inputs only the induction signal component in accordance with the distance between the coordinate indicator and each loop of the excitation line and the detection line. As a result, the position information indicated by the coordinate indicator can be accurately detected by the control circuit.

Also, according to the above third to eighth aspect of the invention, the first or second sense line is connected so that the directions of the first and second loops of the differential sense line are opposite to each other. Therefore, in the case where the coordinate indicator is apart from the first and second loops of the differential sense line, even though the distance of the return portion of the sense line is short, the direct electromagnetic coupling between the first and second sense lines is canceled and not oscillated. The sense lines each consisting of one loop cause the direct electromagnetic coupling to some degree. However, with the use of the above differential sense line in the peripheral portion of the coordinate reader, the distance of the return portion of the sense line can be made long to some degree, and no oscillation occurs.

Subsequently, when the coordinate indicator is made to approach the region where the first and second sense lines intersect, there is formed an oscillating circuit of a positive feedback loop consisting of the amplifying circuit, the first and second sense lines, and resonance circuit, thereby generating the oscillation signal. This oscillation signal is processed by the signal processing circuit, thereby being capable of obtaining the amplitude information on the oscillation signal. The oscillation signal contains no oscillation signal component due to the direct electromagnetic coupling between the first and second sense lines, and only the oscillation signal component corresponding to the distance between the coordinate indicator and each loop of the first and second sense lines is obtained. Therefore, the position information indicated by the coordinate indicator can be accurately detected.

BRIEF DESCRIPTION OF THE DRAWINGS

FIG. 11 is an explanatory diagram for explaining an excitation line and a detection line in the coordinate reader in accordance with the first embodiment of the present invention;

FIG. 12 is an explanatory diagram for explaining a method of determining a loop position that a coordinate indicator approaches in the coordinate reader of the first embodiment of the present invention;

FIG. 23 is a table showing a relationship between phase change-over signals and selected loop positions in the coordinate reader of the second embodiment of the present invention;

FIG. 27 is a table showing a relationship between selection signals of a second scanning circuit and selected sense lines in the coordinate reader in accordance with the third embodiment of the present invention;

FIG. 28 is a table showing a relationship between selection signals of a phase change-over circuit and input polarities of a selected amplifying circuit in the coordinate reader in accordance with the third embodiment of the present invention;

FIG. 31 is a table showing a relationship between selection signals of a first scanning circuit and selected sense lines in the coordinate reader in accordance with the fourth embodiment of the present invention;

FIG. 32 is a table showing a relationship between selection signals of a second scanning circuit and selected sense lines in the coordinate reader in accordance with the fourth embodiment of the present invention;

FIG. 35 is a table showing a relationship between selection signals of a second scanning circuit and selected sense lines in the coordinate reader in accordance with the fifth embodiment of the present invention;

FIG. 36 is a table showing a relationship between selection signals of a phase change-over circuit and input polarities of a selected amplifying circuit in the coordinate reader in accordance with the fifth embodiment of the present invention;

FIG. 37 is a table showing a relationship of sense line addresses, selection signals and selected sense lines in the coordinate reader in accordance with the fifth embodiment of the present invention;

FIG. 39 is a table showing a relationship between selection signals of the first scanning circuit and selected sense lines in the coordinate reader in accordance with the sixth embodiment of the present invention;

FIG. 40 is a table showing a relationship between selection signals of the second scanning circuit and selected sense lines in the coordinate reader in accordance with the sixth embodiment of the present invention;

FIG. 42 is a flowchart showing the operation of the coordinate reader in accordance with the sixth embodiment of the present invention.

DETAILED DESCRIPTION OF THE PREFERRED EMBODIMENTS

Hereinafter, a description will be given of a coordinate reader in accordance with the present invention with reference to the accompanying drawings.

Figure 1:
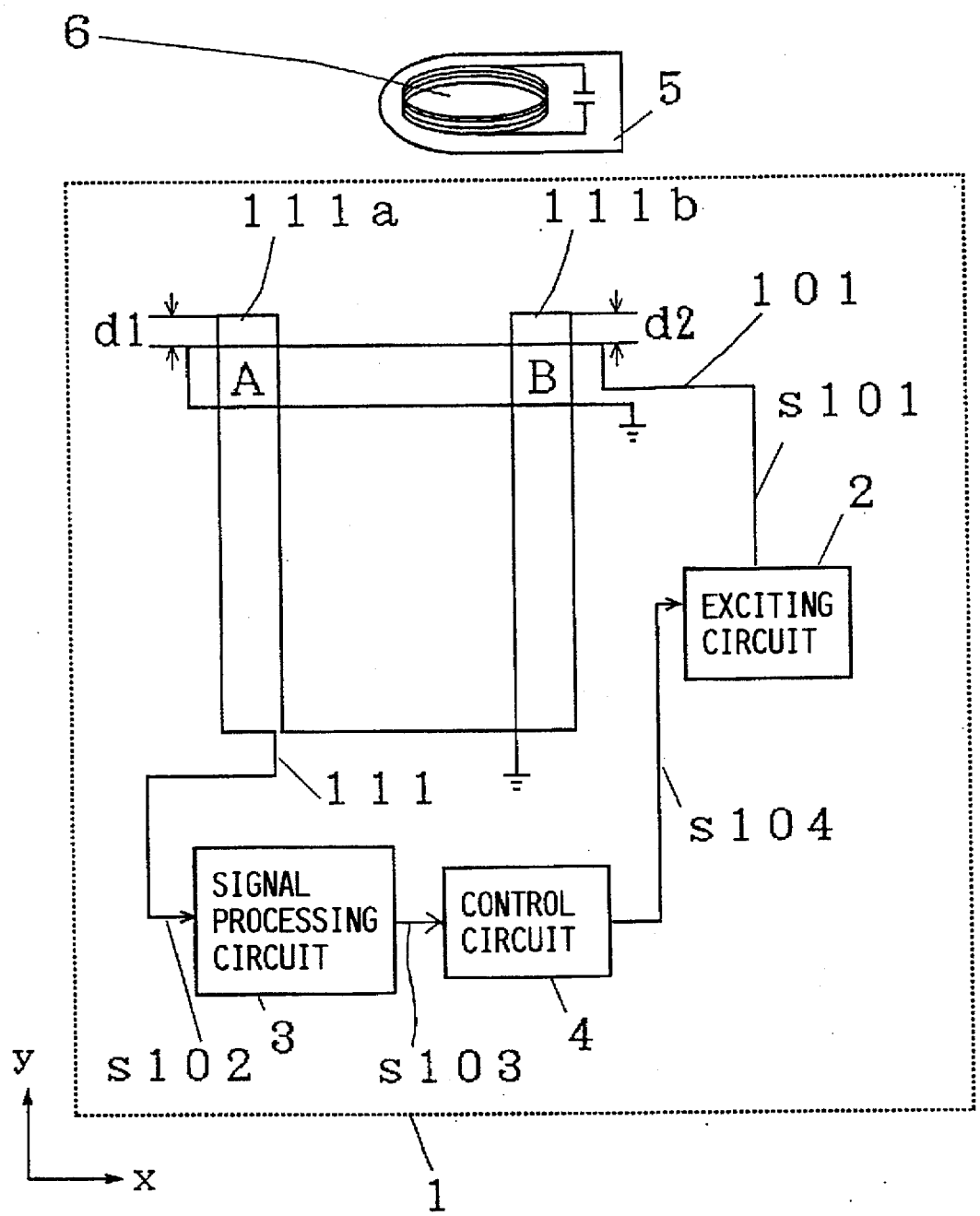
FIG. 1 is a structural diagram showing a coordinate reader with a first structure in accordance with the present invention.
Figure 9:
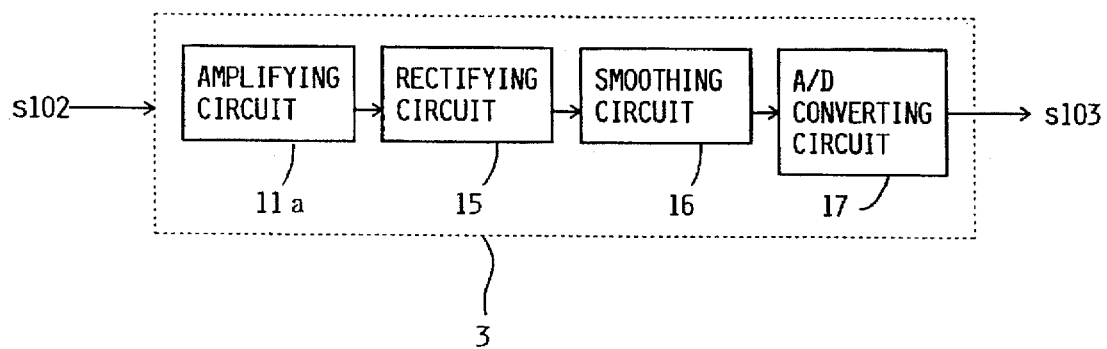
FIG. 9 is a structural diagram showing a signal processing circuit in accordance with the present invention.

FIG. 1 is a structural diagram showing a coordinate reader with a first structure in accordance with the present invention. In the figure, reference numeral 2 denotes an exciting circuit, and 3 denotes a signal processing circuit. The signal processing circuit 3 is constituted, as shown in FIG. 9, so that an induction signal s102 generated from a detection line 111 is inputted, amplified by an amplifying circuit 11a, rectified by a rectifying circuit 15, smoothed by a smoothing circuit 16, and A/D-converted into a digital signal, to thereby output amplitude information s103 of the induction signal s102. Reference numeral 4 denotes a control circuit connected to an output of the signal processing circuit 3. The above-mentioned components are contained in a coordinate detector body 1. Also, reference numeral 5 denotes a coordinate indicator including a resonance circuit 6 which is comprised of a capacitor and a coil.

Reference symbol s101 denotes an exciting signal outputted from the exciting circuit 2; s102, an induction signal; s103, the amplitude information of the induction signal s102; and s104, an excitation control signal. An excitation line 101 is in the form of a rectangular loop, has one end connected to the exciting circuit 2, and is placed in parallel with the x-axis of an x and y orthogonal coordinate system. The detection line 111 is comprised of a first loop 111a and a second loop 111b which are in the rectangular shape equal in length, width and winding number to each other. The first loop 111a and the second loop 111b are connected so that the directions of those loops are opposite to each other. The detection line 111 has one end connected to the signal processing circuit 3 and placed in parallel with the y-axis of the x and y orthogonal coordinate system.

Furthermore, the detection line 111 is placed so that distances d1 and d2 of return portions are equal to each other, whereby mutual inductance between the excitation line 101 and the second loop 111b of the detection line 111 is -m, assuming that the strength of electromagnetic coupling between the excitation line 101 and the first loop 111a of the detection line 111, that is, the mutual inductance is m. As a result, the total mutual inductance between the excitation line 101 and the detection line 111 can be set to zero.

Also, in this structure, it is assumed that an interval between the first loop 111a and second loop 111b of the detection line 111 are sufficiently apart from each other so that they are not electromagnetically coupled with each other.

The distances between the excitation line 101 and the return portions indicating the end portions of the respective loops of the detection line 111 satisfy the condition of d1=d2, even though d1 and d2 are set arbitrarily, the total mutual inductance between the excitation line 101 and the detection line 111 can be set to zero. For the purposes of reducing an invalid region in the peripheral portion of the coordinate detector to more downsize the coordinate detector body, it is preferable to make the distances d1 and d2 at the return portions shorter.

Subsequently, a description will be given of the operation of the coordinate reader with the above-mentioned structure.

First, when the excitation control signal s104 is outputted from the control circuit 4, the excitation signal s101 is outputted from the exciting circuit 2 in response to the excitation control signal s104, thereby developing an alternating magnetic field from the excitation line 101. In this situation, when the coordinate indicator 5 is sufficiently apart from regions A and B where the excitation line 101 and the first group 111a and second group 111b of the detection line 111 intersect, respectively, the electromagnetic induction phenomenon developing among the excitation line 101, the resonance circuit 5 and the detection line 111 is not realized. Also, the direct electromagnetic coupling between the excitation line 101 and the detection line 111 becomes zero. As a result, no induction signal s102 is induced from the detection line 111.

Subsequently, a description will be given of a case where the coordinate indicator 5 is made to approach the region A where the excitation line 101 and the first loop 111a of the detection line 111 intersect. In this case, since the resonance circuit 6 equipped within the coordinate indicator 5 is so constituted as to resonate at a frequency of the excitation signal s101, the electromagnetic induction phenomenon is realized among the excitation line 101, the resonance circuit 6 within the coordinate indicator 5 and the detection line 111. As a result, the induction signal s102 is induced from the detection line 111. Moreover, the signal processing circuit 3 subjects the induction signal s102 to amplifying, rectifying and smoothing processes, and then to A/D conversion, thereby obtaining the amplitude information s103 of the induction signal s102 corresponding to a position indicated by the coordinate indicator 5 as a digital value. The amplitude information s103 thus obtained is outputted to the control circuit 4. In the control circuit 4, position information indicated by the coordinate indicator 5 can be obtained in accordance with the amplitude information s103. The position information, as described above, contains no induction signal component generated by the direct electromagnetic coupling between the excitation line 101 and the detection line 111, as a result of which the position information indicated by the coordinate indicator 5 can be detected with accuracy in the control circuit 4.

Further, a description will be given of a case where the coordinate indicator 5 is made to approach the region B where the excitation line 101 and the second loop 111b of the detection line 111 intersect. Similarly to the case where the coordinate indicator 5 is made to approach the region A, the induction signal s102 and its amplitude signal s103 can be obtained so that the position information indicated by the coordinate indicator 5 can be detected in the control circuit 4.

Figure 2:
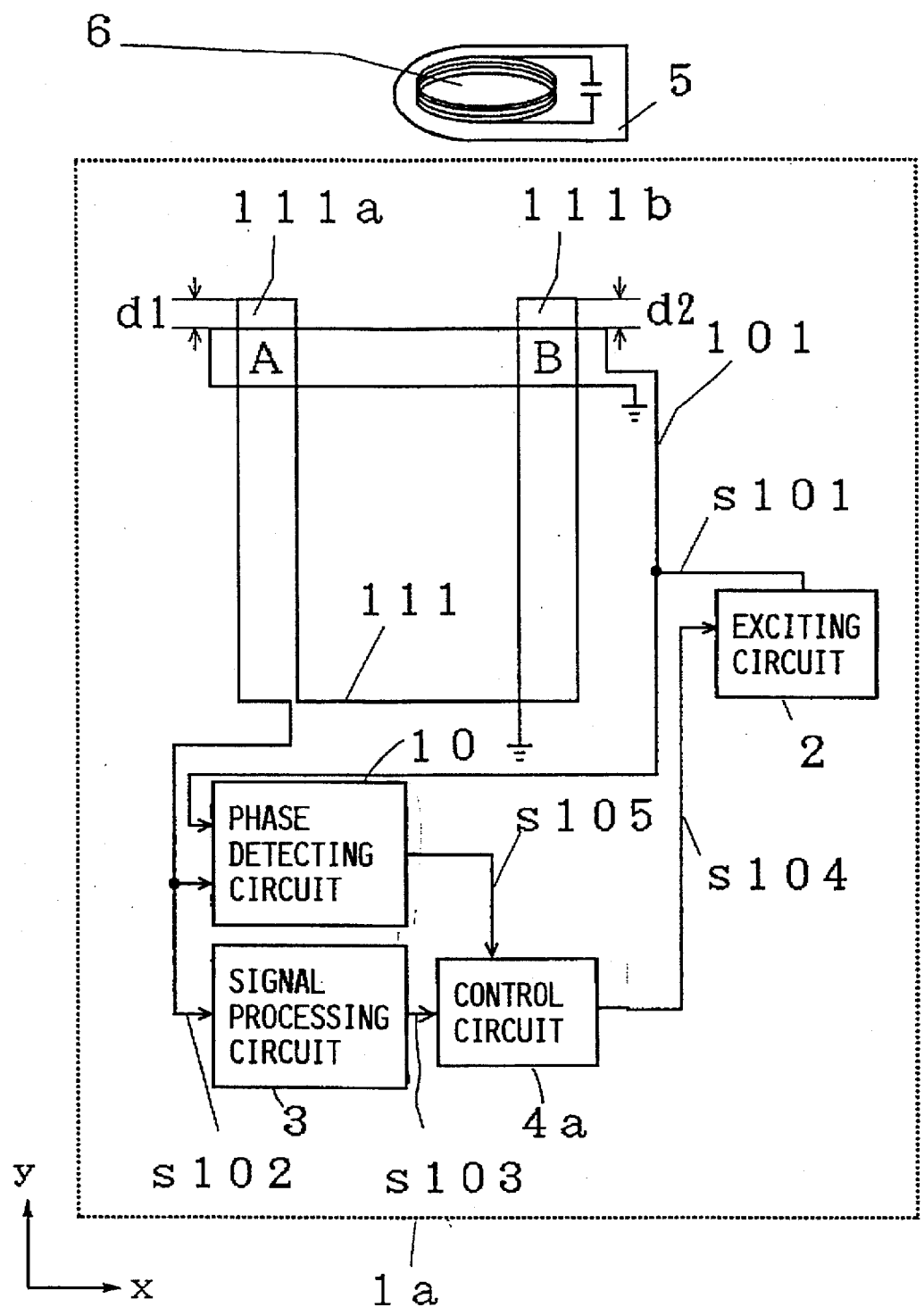
FIG. 2 is a structural diagram showing a coordinate reader with a second structure in accordance with the present invention.

Next, a description will be given of the coordinate reader with a second structure in accordance with the present invention with reference to FIG. 2.

In the second structure of the coordinate reader, a phase detecting circuit 10 which receives an output of the exciting circuit 2 as well as an output of the detection line 111 to output loop position information is added to the first structure of the coordinate reader. The phase detecting circuit 10 is arranged to detect a phase difference between the excitation signal s101 and the induction signal s102 and to compare a previously calculated phase difference with a phase difference corresponding to a loop position that the coordinate indicator 5 approaches. Then, the phase detecting circuit 10 outputs a comparison result to the control circuit 4a as loop position information s105 so that it can be discriminated whether the detection line 111 that the coordinate indicator 5 approaches is of the loop 111a or the loop 111b.

Subsequently, a description will be given of the operation of the coordinate reader with the above second structure.

First, the control circuit 4a outputs the excitation control signal s104 to the exciting circuit 2, and the exciting circuit 2 outputs the excitation signal s101 in accordance with the excitation control signal s104, whereby an alternating magnetic field develops from the excitation line 101. In the case where the coordinate indicator 5 is sufficiently apart from the regions A and B where the excitation line 101 and the first group 111a and second group 111b of the detection line 111 intersect, respectively, as described in association with the above first structure of the coordinate reader, no induction signal s102 is generated from the detection line 111.

In the case where the coordinate indicator 5 is made to approach the region A where the excitation line 101 and the first loop 111a of the detection line 111 intersect, the induction signal s102 is generated from the detection line 111.

Similarly, in the case where the coordinate indicator 5 is made to approach the region B where the excitation line 101 and the second loop 111b of the detection line 111 intersect, the induction signal s102 is induced.

The above operation is identical to that in the above first basic structure except that a phase difference between the excitation signal s101 and the induction signal s102 induced from the detection line 111 is shifted by 180 degrees between the case where the coordinate indicator 5 is made to approach the region A and the case where it is made to approach the region B.

Therefore, in this second structure of the coordinate reader, there is provided the phase detecting circuit 10 for detecting the phase difference between the excitation signal s101 and the induction signal s102. With this structure, the detected phase difference is compared with a previously calculated phase difference corresponding to the loop position that the coordinate indicator 5 approaches, thereby being capable of obtaining the position of the loop that the coordinate indicator 5 approaches. Moreover, this result is outputted from the phase detecting circuit 5 to the control circuit 4 as the loop position information s105, whereby it can be detected whether what the coordinate indicator 5 approaches is of the loop 111a or loop 111b. Such detection cannot be made in the first structure of the coordinate reader.

In the first and second structures of the coordinate reader, additional variations can be given to those structures.

In the first and second structures, the detection line 111 includes two loops. However, the excitation line 101 may include two loops instead.

Also, in the second structure, the phase detecting circuit 10 is provided for detecting the phase difference between the induction signal s102 outputted from the detection line 111 and the excitation signal s101 to obtain the loop position information s105. In brief, any structure will do, so long as it can detect the loop position that the coordinate indicator 5 approaches. For example, the loop position that the coordinate indicator 5 approaches can be detected similarly by detecting the phase difference between a signal resulting from amplifying the induction signal s102 and the excitation signal s101 in the signal processing circuit 3.

Subsequently, a description will be given of another example of the first structure of the coordinate reader in accordance with the present invention with reference to FIG. 3.

This structure is an example of a method of placing the excitation line and the detection line shown by the first structure, and is arranged in such a manner that the excitation line forming two loops is placed instead of the excitation line 101 shown in FIG. 1. That excitation line 201 is comprised of a first loop 201a and a second loop 201b which are in the rectangular shape equal in length, width and winding number to each other. One end of the excitation line 201 is connected to the output of the excitation circuit 2. Likewise as the excitation line 201, the detection line 211 is also comprised of a first loop 211a and a second loop 211b which are in the rectangular shape equal in length, width and winding number to each other. One end of the detection line 211 is connected to the input of the signal processing circuit 3. The excitation line 201 is placed in such a manner that the loop direction of the first loop 201b and the loop direction of the second loop 201a are opposite to each other, and likewise the detection line 211 is placed in such a manner that the loop direction of the first loop 211a and the loop direction of the second loop 211b are opposite to each other.

The distances d1 to d4 of the return portions are set so that the conditions of d1=d2 and d3=d4 are satisfied.

With the above structure of the excitation line 201 and the detection line 211, if it is assumed that the mutual inductance of the loop 201a of the excitation line 201 and the loop 211a of the detection line 211 is M, the mutual inductance of the loop 201b of the excitation line 201 and the loop 211a of the detection line 211 is -M, and the mutual inductance of the excitation line 201 and the detection line 211a is zero. Hence, the total mutual inductance of the excitation line 201 and the detection line 211 is zero, whereby an induction signal component caused by the direct electromagnetic coupling between the excitation line 201 and the detection line 211 can be canceled.

The exciting circuit 2, the signal processing circuit 3, the control circuit 4, and the coordinate indicator 5 having the resonance circuit 6 are the same as those in the above first structure.

Next, a description will be given of the operation of the coordinate reader with the above structure.

In the case where the coordinate indicator 5 is sufficiently apart from regions A to D where the respective loops of the excitation loop 201 and detection line 211 intersect each other, similarly to the above first structure, the electromagnetic induction phenomenon developing among the excitation line 201, the resonance circuit 5 and the detection line 211 is not realized. Also, the direct electromagnetic coupling between the excitation line 201 and the detection line 211 becomes zero. As a result, no induction signal s102 is generated from the detection line 211.

When the coordinate indicator 5 is made to approach the regions A to D, the induction signal s102 is generated from the detection line 211. A process of obtaining the amplitude information s103 of the induction signal from that induction signal s102 in the control circuit 4 is the same as the operation of the above first structure, and therefore its description will be omitted.

Similarly to the above second structure, this structure is provided with the phase detecting circuit 10 so that it can be discriminated which of the loops 201a and 201b of the excitation line 201 the coordinate indicator 5 approaches, or which of the loops 211a and 211b of the detection line 211 the coordinate indicator 5 approaches.

Further, if it is assumed that the distances satisfy the conditions of d1=d2, d3=d4 at the return portions, d1 to d4 can be set arbitrarily. In order to reduce the invalid region in the peripheral portion of the coordinate detector and to downsize the coordinate detector body 1b, d1 to d4 are preferably set as short as possible.

The above-mentioned first and second structures are examples of the principle of the structure according to the present invention. Therefore, for the purpose of detecting the coordinates of the two-dimensional position indicated by the coordinate indicator as in the general coordinate reader, it is required to place a plurality of excitation lines and a plurality of detection lines in the x- and y- directions in the x, y orthogonal coordinate system, respectively, and to calculate a position indicated by the coordinate indicator in accordance with the amplitude distribution of the induction signal generated from the detection line. Hereinafter, a description will be given of an example in which the coordinate in the x-direction indicated by the coordinate indicator 5 is detected. The coordinate in the y-direction is detected in the same manner as that of detecting the coordinate in the x-direction.

Figure 3:
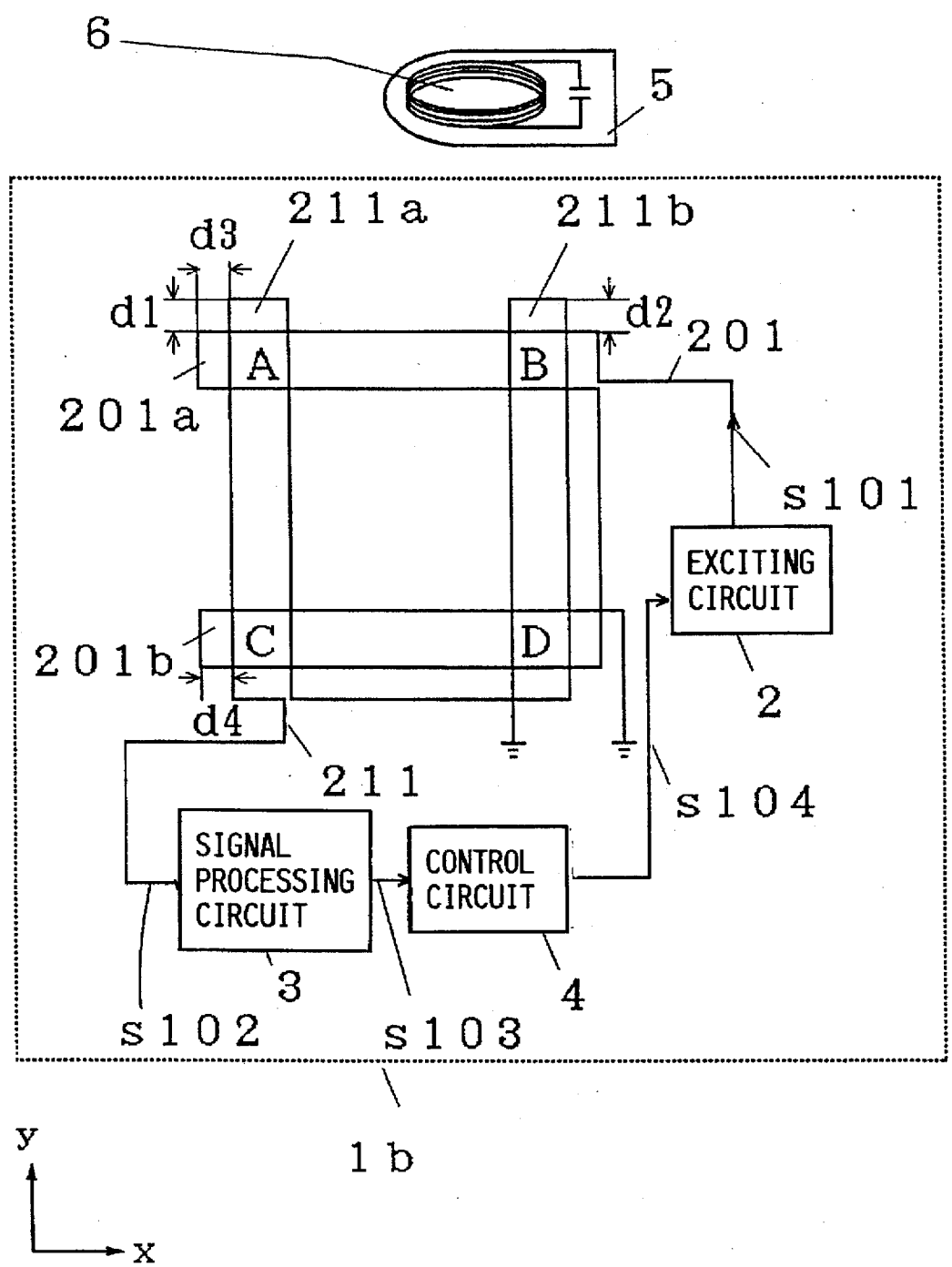
FIG. 3 is a structural diagram showing another example of the coordinate reader with the first structure in accordance with the present invention.
Figure 4:
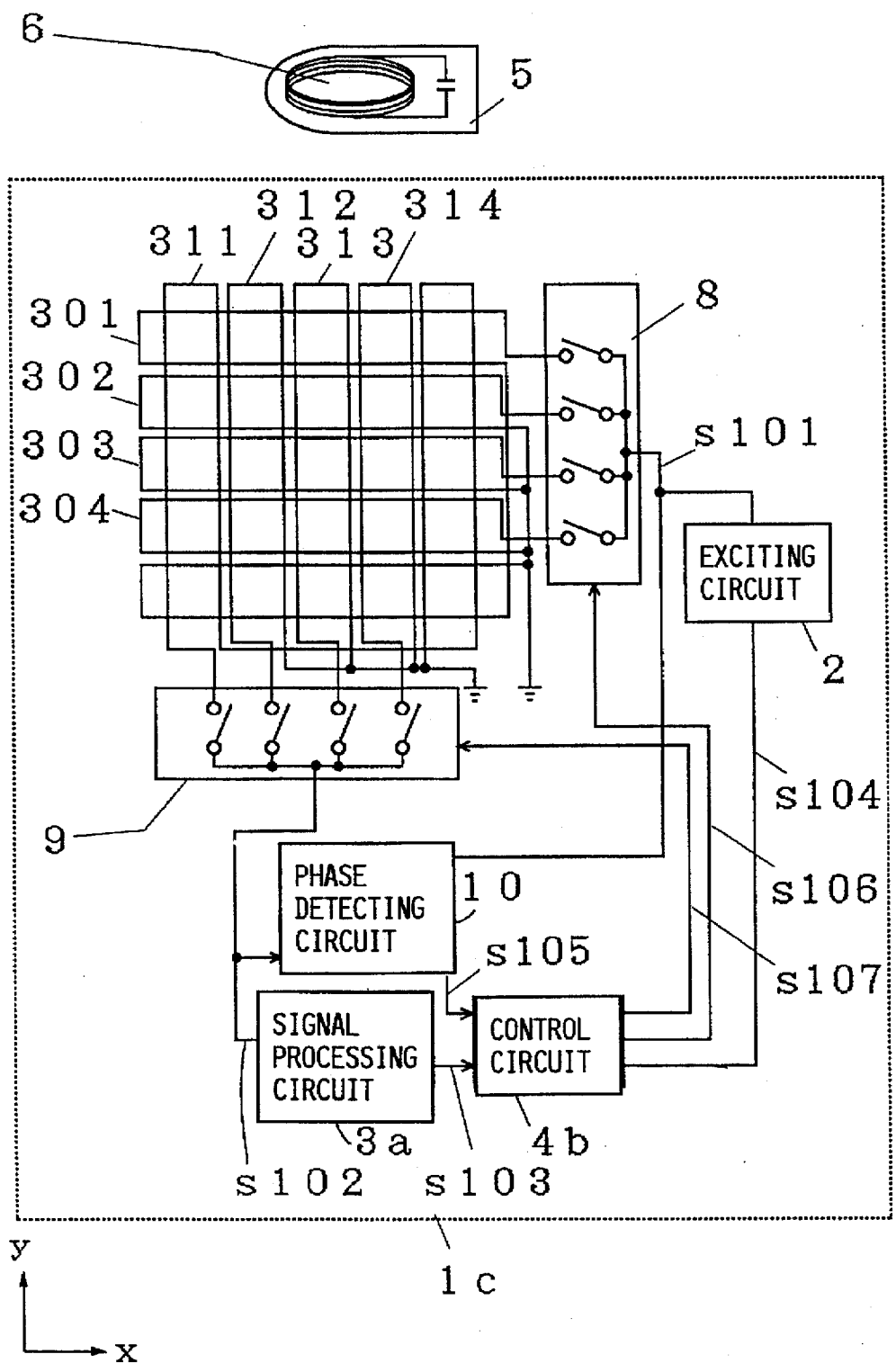
FIG. 4 is a structural diagram showing a coordinate reader in accordance with a first embodiment of the present invention.
Figure 20:
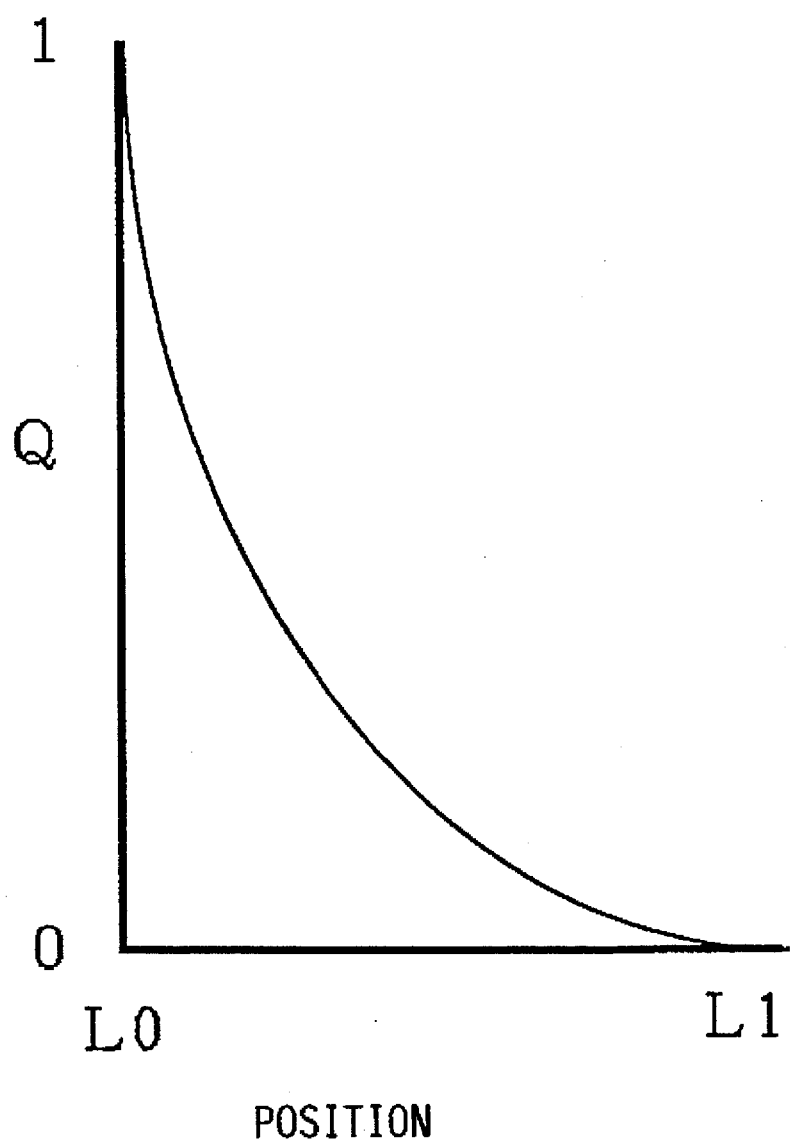
FIG. 20 is an explanatory graph showing a change of Q in the case where the coordinate indicator is placed between L0 and L1 of FIG. 17.
Figure 21:
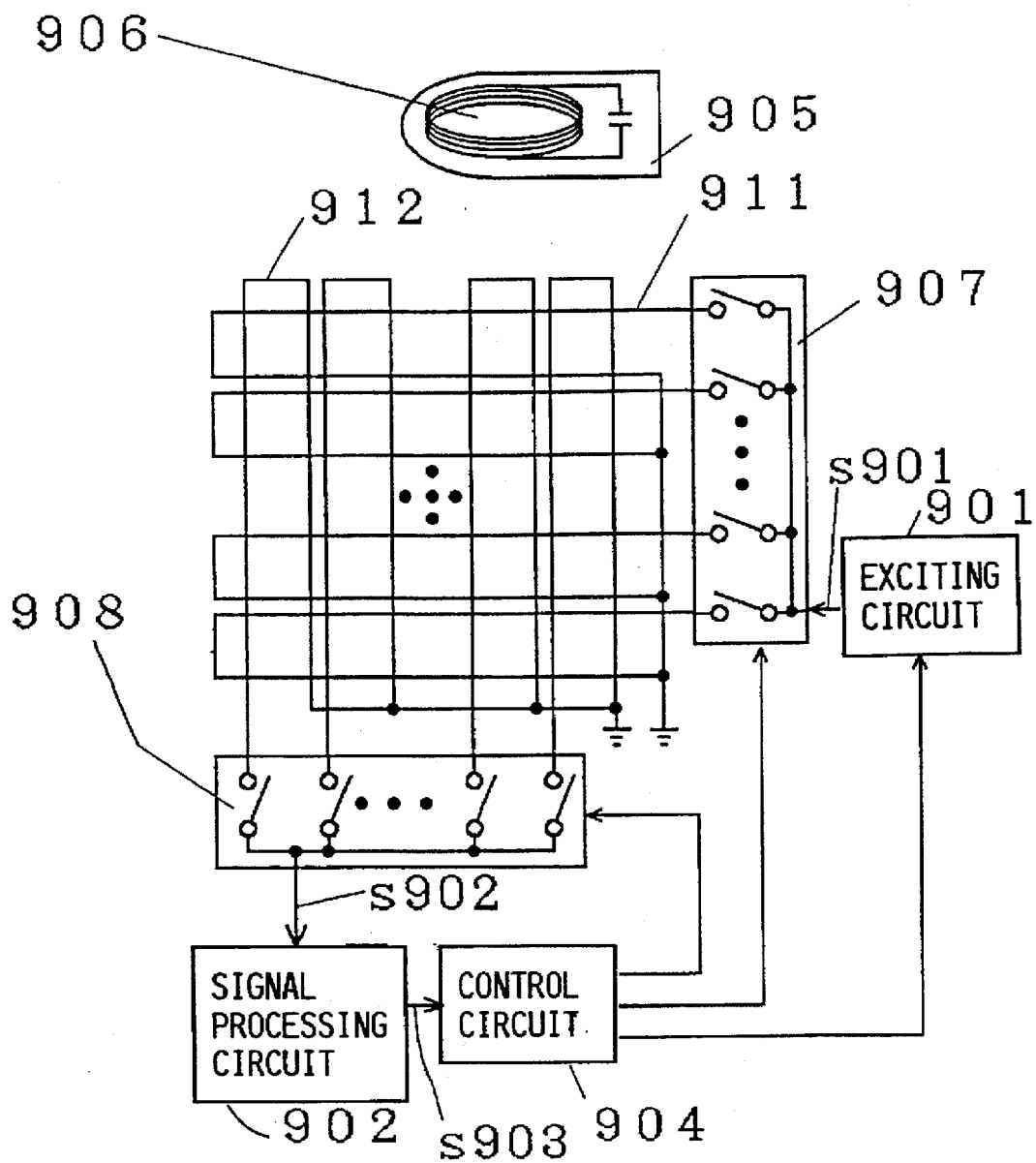
FIG. 21 is a structural diagram showing a conventional coordinate reader.
Figure 22:
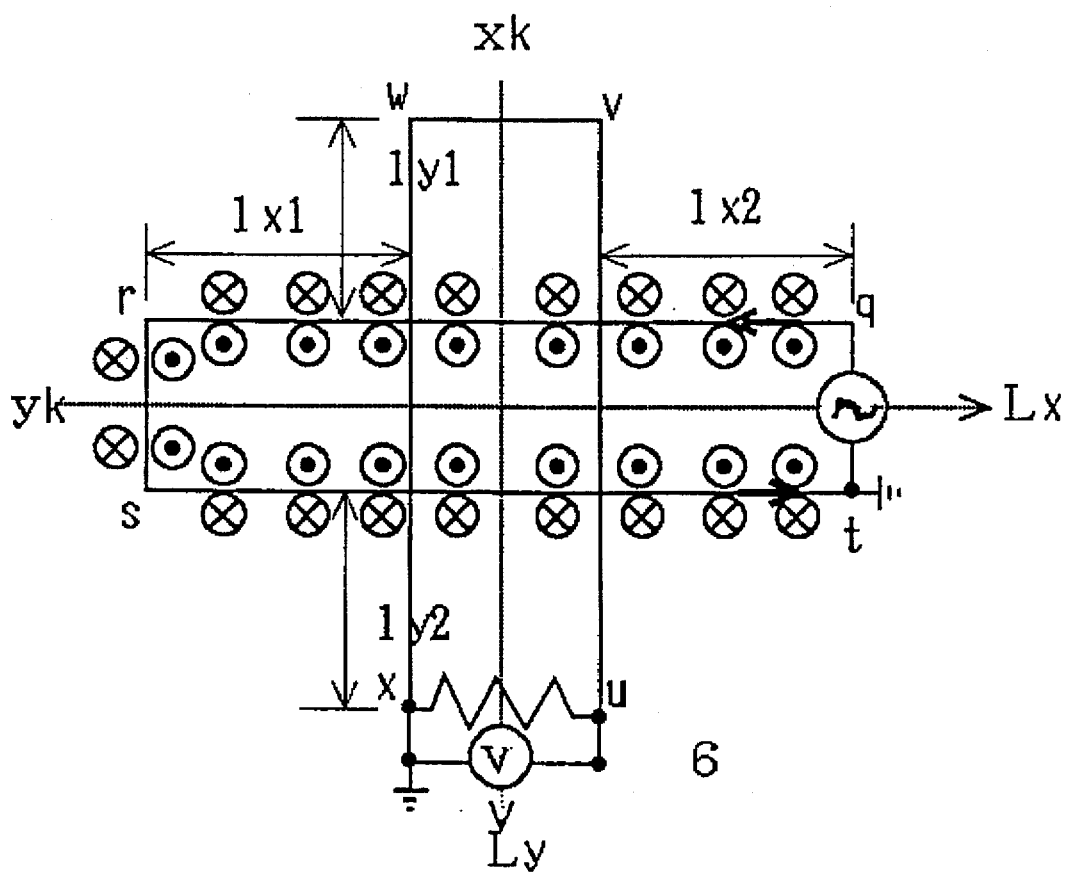
FIG. 22 is an explanatory diagram for explaining a state of induction due to electromagnetic coupling between an excitation line group and a detection line group.

FIG. 4 is a structural diagram showing a coordinate reader having its peripheral portion to which the structure of the excitation line and the detection line shown in FIG. 3 is applied, in addition to the structure of the excitation line and detection line shown in the conventional example of FIG. 20, in accordance with the first embodiment.

FIG. 11 is a structural diagram showing the structure of the excitation line 301 and the detection line 311.

The excitation line 301 and the detection line 311 are comprised of two loops, respectively, and arranged so that the loop directions of those two loops are opposite to each other. The structure of the excitation line 301 and the detection line 311 is shown in FIG. 11. Excitation lines 302 to 304 each forming one loop are placed in parallel with the x-axis of the x, y orthogonal coordinate system at constant intervals between the first loop 301a and the second loop 301b of the excitation line 301 so that they are parallel with each other. Further, detection lines 312 to 314 each forming one loop are placed in parallel with the y-axis of the x, y orthogonal coordinate system at constant intervals between the first loop 311a and the second loop 311b of the detection line 311 so that they are parallel with each other. Reference numeral 8 denotes an excitation line scanning circuit connected to the exciting circuit 2 for sequentially selecting only one excitation line from the excitation lines 301 to 304, and 9 denotes a detection line scanning circuit connected to the signal processing circuit 3 as well as the phase detecting circuit 10 for sequentially selecting only one detection line from the detection lines 311 to 314. Reference numeral 2 denotes an exciting circuit for supplying the excitation signal s101 to the excitation lines 301 to 304; 3a, a signal processing circuit connected to the detection line scanning circuit 9 for processing the induction signal s102 generated from the detection lines 311 to 314; 4b, a control circuit which controls the exciting circuit 2, the excitation line scanning circuit 8 and the detection line scanning circuit 9, and which is also connected to the signal processing circuit 3a and a phase inverse circuit 10 which will be described later so as to have a function of calculating a position indicated by the coordinate indicator 5, which will be described later. Reference numeral 10 denotes a phase detecting circuit connected to the exciting circuit 2 and the detection line scanning circuit 9 for outputting information on the loop position that the coordinate indicator 5 approaches to the control circuit 4b. The above components are parts contained in the coordinate detector body 1c. Reference numeral 5 denotes a coordinate indicator having a resonance circuit 6.

Reference symbol s101 denotes an excitation signal; s102, an induction signal; s103, the amplitude information on the induction signal s102; s104, an excitation control signal for controlling the exciting circuit 2; s105, loop position information indicative of the position of a loop that the coordinate indicator 5 approaches; s106, an excitation line selection signal for controlling the excitation line scanning circuit 8; and s107, a detection line selection signal for controlling the detection line scanning circuit 9.

Subsequently, the operation of the coordinate reader according to this embodiment will be described.

First, the control circuit 4b outputs the excitation control signal s104, the excitation line selection signal s106 and the detection line selection signal s107 on the basis of a scanning method to be described later. The excitation line scanning circuit 8 sequentially selects one excitation line from the excitation lines 301 to 304. Simultaneously, the detection line scanning circuit 9 sequentially selects one detection line from the detection lines 311 to 314, and leads the induction signal s102 to the signal processing circuit 3a and the phase detection circuit 10. A process of obtaining the amplitude information s103 on the induction signal s102 from the induction signal s102 is the same as the operation of the above-mentioned first structure, and therefore its description will be omitted.

The control circuit 4b is capable of accurately detecting a position indicated by the coordinate indicator 5 in accordance with the distribution of the amplitude information s103 as well as the loop position information s105 which are obtained by sequentially selecting the excitation lines 301 to 304 and the detection lines 311 to 314.

A method of scanning the excitation lines 301 to 304 and the detection lines 311 to 314 will be described. It should be noted that this method represents one example and the invention is not limited to or by this scanning method.

The control circuit 4b sequentially outputs the excitation line selection signal s106 so as to select the excitation lines 301 to 304. In selection of the excitation line 301, two portions of the first loop 301a and the second loop 301b as shown in FIG. 11 are selected.

Simultaneously, the control circuit 4b sequentially outputs the detection line selection signal s107 so as to select the detection lines 311 to 314. In selection of the detection line 311, two portions of the loop 311a and the loop 311b as shown in FIG. 11 are selected.

In conclusion, four kinds of the excitation line selection signals s106 and four kinds of detection line selection signals s107 are combined into 16 kinds of excitation and detection line selection signals in total. Moreover, in selection of the excitation line 301, two portions of the loop 301a and the loop 301b are selected. In selection of the detection line 311, two portions of the loop 311a and the loop 311b are selected. As a result, the excitation lines 301 to 304 and the detection lines 311 to 314 are selected in the form of a matrix, thereby being capable of obtaining the amplitude information s103 on the induction signal in 25 regions where each loop of the excitation lines 301 to 304 and each loop of the detection lines 311 to 314 intersect, in the control circuit 4b.

A method of determining a loop position that the coordinate indicator 5 approaches will be described with reference to FIGS. 12 to 16.

FIGS. 12 to 16 are explanatory diagram or graphs for explaining the method of determining the loop position that the coordinate indicator 5 approaches in the first embodiment.

In the structure of the present invention, under a first condition where the coordinate indicator 5 exists in the vicinity of a region 11 where the first loop 301 of the excitation line 301 and the first loop 311a of the detection line 311 intersect, upon selection of the excitation line 301 and the detection line 311, the induction signal s102 is induced from the detection line 311, thereby being capable of obtaining the amplitude information s103 on the induction signal. Similarly, under second, third and fourth conditions where the coordinate indicator 5 approaches regions 15, 51 and 55, the induction signal s102 is induced from the detection line 311, thereby being capable of obtaining the amplitude information s103 on the induction signal. Then, it is discriminated whether the coordinate indicator 5 approaches to the first or fourth condition, or the second or third condition, in the position detecting circuit 10 on the basis of the above-mentioned principle. In other words, in the case where the coordinate indicator 5 approaches to the first or fourth condition, the loop position information s105 is 0 whereas, in the case where the coordinate indicator 5 approaches to the second or third condition, the loop position information s105 is 1.

Figure 13:
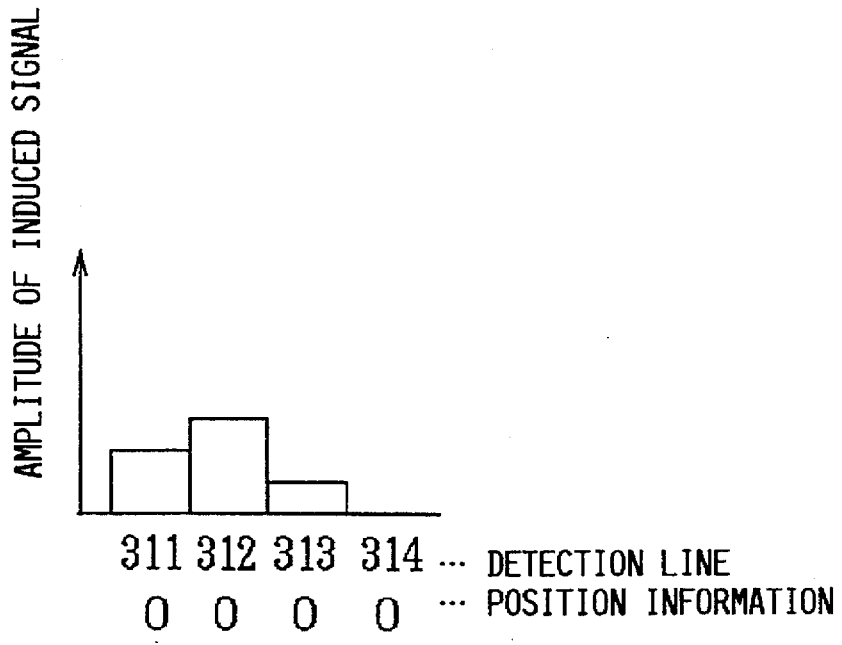
FIG. 13 is an explanatory graph for explaining a method of determining a loop position that a coordinate indicator approaches in the coordinate reader of the first embodiment of the present invention.

FIGS. 13 to 16 are explanatory graphs showing the respective induction signals and loop position information s105 when the coordinate indicator 5 is located in the vicinity of the regions 11, 51, 15 and 55 shown in FIG. 12. FIG. 13 shows a case where the coordinate indicator 5 is located in the vicinity of the intersection of the excitation line 301a and the detection line 312, which is near the region 11. The induction voltage developed in the detection line 312 is largest, and the amplitude of the induction signal is reduced more as the sense line is away from the detection line 312. In this case, since the coordinate indicator 5 is positioned on the excitation line 301a, the loop position information s105 outputted from the phase detecting circuit 10 is 0 with respect to the respective detection lines 311 to 314.

Figure 14:
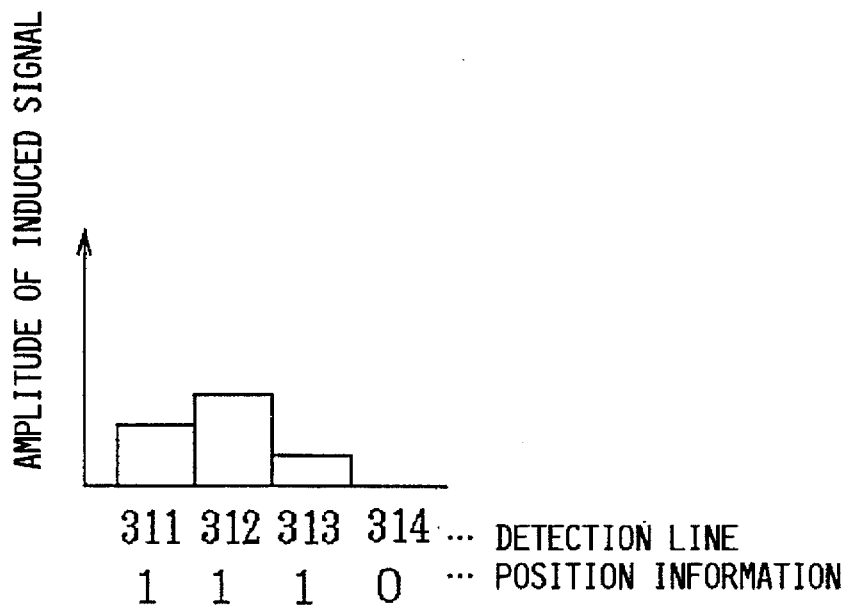
FIG. 14 is an explanatory graph for explaining a method of determining a loop position that a coordinate indicator approaches in the coordinate reader of the first embodiment of the present invention.

FIG. 14 shows a case where the coordinate indicator 5 is located in the vicinity of the intersection of the excitation line 301b and the detection line 312, which is near the region 11. The amplitude of the induction signal generated in the detection line 312 is largest, and the amplitude of the induction signal is reduced more as the sense line is away from the detection line 312. In this case, since the coordinate indicator 5 is positioned above the excitation line 301b, the loop position information s105 outputted from the phase detecting circuit 10 is 1 with respect to the respective detection lines 311 to 314. The loop position information s105 on the detection line 314 is 0 because the amplitude of its induction signal is extremely small.

Figure 15:
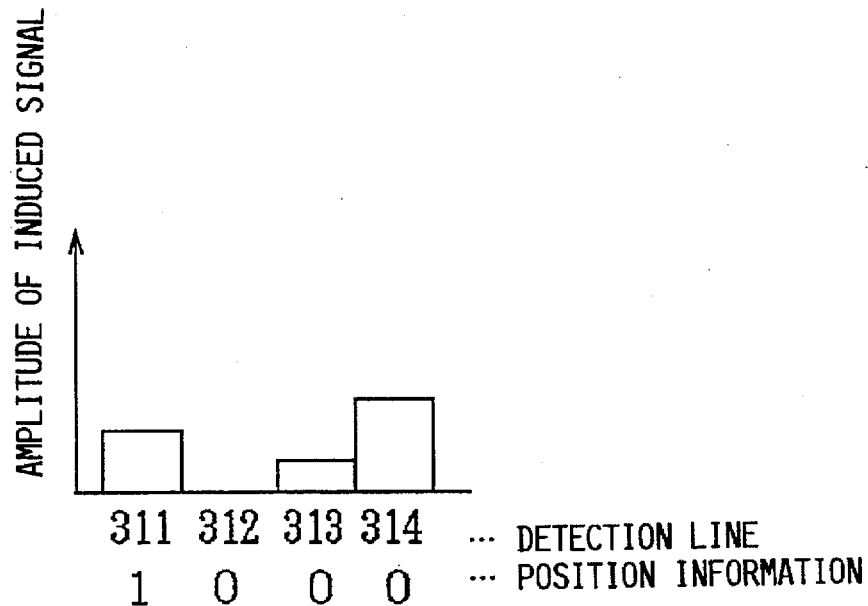
FIG. 15 is an explanatory graph for explaining a method of determining a loop position that a coordinate indicator approaches in the coordinate reader of the first embodiment of the present invention.

FIG. 15 shows a case where the coordinate indicator 5 is located in the vicinity of the intersection of the excitation line 301a and the detection line 314, which is near the region 15. The amplitude of the induction signal generated in the detection line 314 is largest, and the amplitude of the induction signal is reduced more as the sense line is away from the detection line 314. The reason that the amplitude of the induction signal from the detection signal 311 is relatively large is because the induction signal generated from the detection line 311b is detected. In this case, since the coordinate indicator 5 is positioned above the excitation line 301a, the loop position information s105 outputted from the phase detecting circuit 10 should be 0 with respect to the respective detection lines 311 to 314. However, since the induction signal from the detection line 311b is detected with respect to the detection line 311 as described above, the phase detecting circuit 10 outputs the loop position information s105 on the detection line 311 as 1.

Figure 16:
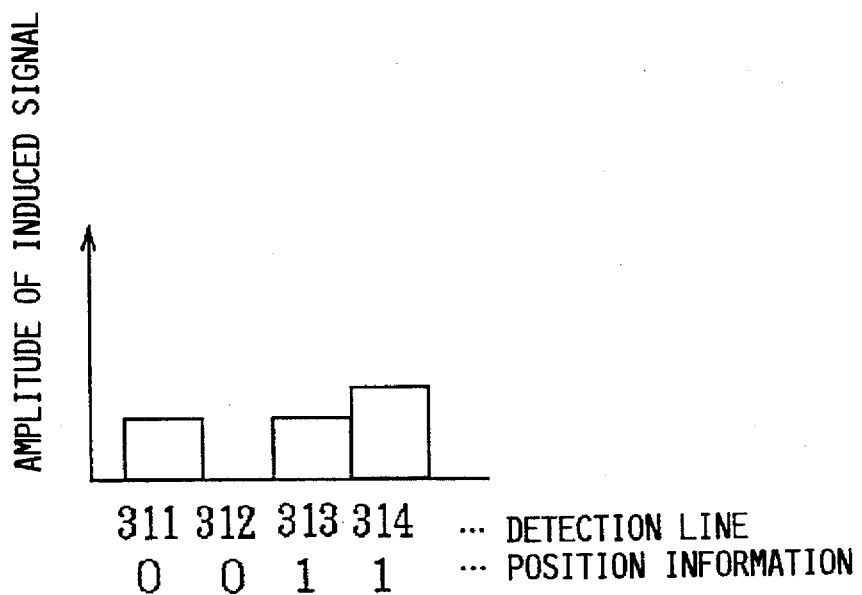
FIG. 16 is an explanatory graph for explaining a method of determining a loop position that a coordinate indicator approaches in the coordinate reader of the first embodiment of the present invention.

FIG. 16 shows a case where the coordinate indicator 5 is located in the vicinity of the intersection of the excitation line 301b and the detection line 314, which is near the region 55. The amplitude of the induction signal generated in the detection line 314 is largest, and the amplitude of the induction signal is reduced more as the sense line is away from the detection line 314. The reason that the amplitude of the induction signal from the detection signal 311 is relatively large is because the induction signal generated from the detection line 311b is detected. In this case, since the coordinate indicator 5 is positioned above the excitation line 301b, the loop position information s105 outputted from the phase detecting circuit 10 should be 1 with respect to the respective detection lines 311 to 314. However, since the induction signal from the detection line 311b is detected with respect to the detection line 311 as described above, the phase detecting circuit 10 further inverses the loop position information s105 on the detection line 311 and outputs the loop position information s105 as 0. Although the loop position information s105 on the detection line 312 should be 1 essentially, it is 0 because the amplitude of its induction signal is extremely small.

Accordingly, the first or fourth condition and the second or third condition can be distinguished by obtaining the loop position information s105 in the control circuit 4b.

Further, the distinction between the first condition and the fourth condition, or the distinction between the second condition and the third condition is made in the following manner. For example, the distinction between the first condition and the fourth condition is readily executed by comparing the amplitude information s103 of the induction signal obtained when the excitation line 302 placed adjacent to the first loop 301a of the excitation line 301 and the detection line 311 are selected, or the excitation line 301 and the detection line 312 placed adjacent to the first loop 311a of the detection line 311 are selected with a predetermined amplitude information value. Alternatively, such a distinction is readily executed by comparing that amplitude information s103 with the amplitude information s103 of the induction signal obtained when the excitation line 304 placed adjacent to the second loop 301b of the excitation line 301 and the detection line 311 are selected, or the excitation line 301 and the detection line 314 placed adjacent to the second loop 311b of the detection line 311 are selected. That is, the distinction between the first condition and the fourth condition, or the distinction between the second condition and the third condition is made by selecting an address constituted by an excitation line or detection line consisting of one loop adjacent to a differential sense line consisting of first and second loops, detecting the amplitude information s103 of the induction signal in that selection state, and discriminating the conditions in accordance with that detected amplitude information.

Also, two addresses necessarily exist with their phases being shifted by 180 degrees when the differential sense line is used. In this situation, there is only a difference in that the loop position s105 is 0 or 1, and the selection signals s106 and s107 of the excitation line and detection line are not changed. That is, this exhibits a difference between the first and second conditions, that is, a difference between the regions 11 and 15, or a difference between the third and fourth conditions, that is, a difference between the regions 51 and 55.

In the case where the coordinate indicator 5 is extremely inclined or the like, a phase is shifted by 180 degrees in the vicinity of a position where the coordinate indicator 5 exists, from the positional relationship of the resonance circuit 6 with respect to the excitation line or detection line. This may result in a case where an induction voltage develops in an address where no induction signal is generated essentially. For example, when the coordinate indicator 5 exists in the vicinity of the region 11 in an inclined state, the loop position information s105 is not 0 but 1. The control circuit 4b judges that the amplitude information s103 of the induction signal was detected from the region 15 or 51, thus leading to a cause of misrecognition. However, even in this case, in the above-described method of distinguishing between the first condition and the fourth condition, or distinguishing between the second condition and the third condition, misrecognition can be readily prevented by using the magnitude of the amplitude information s103 of the induction signal at the adjacent address. However, in the case of selecting the differential sense lines consisting of two loops together, two addresses exist with the phase being shifted by 180 degrees. Accordingly, misrecognition cannot be judged by the amplitude information s103 of the induction signal which is detected at an address of the differential sense line. However, with the provision of an excitation line and detection line each consisting of one loop at the adjacent address, it can be judged whether it is misrecognition or not in accordance with the magnitude of the amplitude information s103 of the induction signal detected at that address without any problems.

From the above result, in the control circuit 4b, the loop position that the coordinate indicator 5 approaches can be specified by obtaining the distribution of the amplitude information s103 of the induction signal and the loop position information s105, and the position of the coordinate indicator 5 can be roughly specified.

Next, a description will be given of a method of calculating the detailed coordinates indicated by the coordinate indicator 5 with reference to FIGS. 17 to 20. It should be noted that this coordinate calculating method is one example for purposes of description and the present invention is not limited to or by this method.

Figure 17:
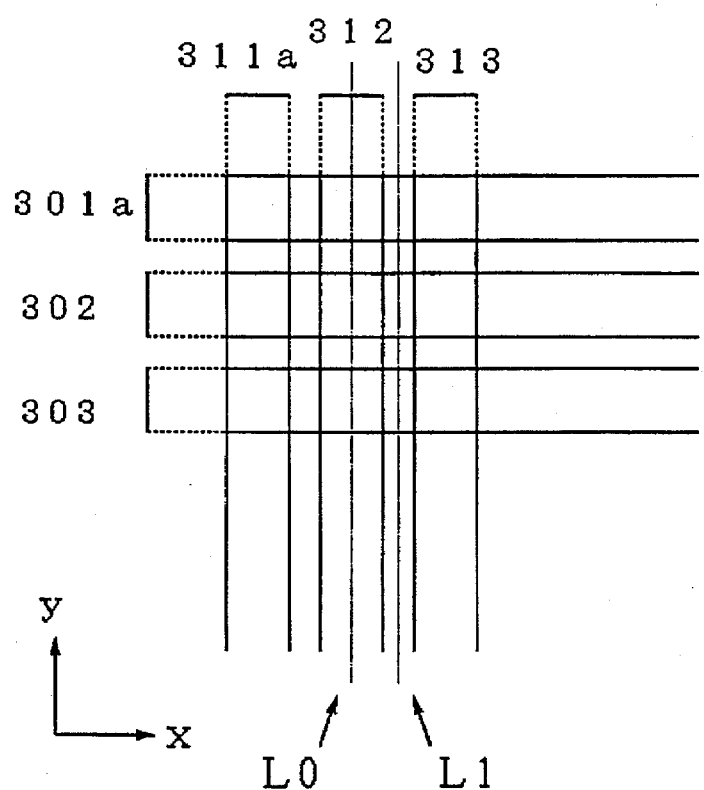
FIG. 17 is an explanatory diagram for explaining a method of calculating coordinates in the coordinate reader of the first embodiment of the present invention.

FIG. 17 shows the excitation line 301 and the detection lines 311 to 314 (the detection line 314 not shown).

Figure 18:
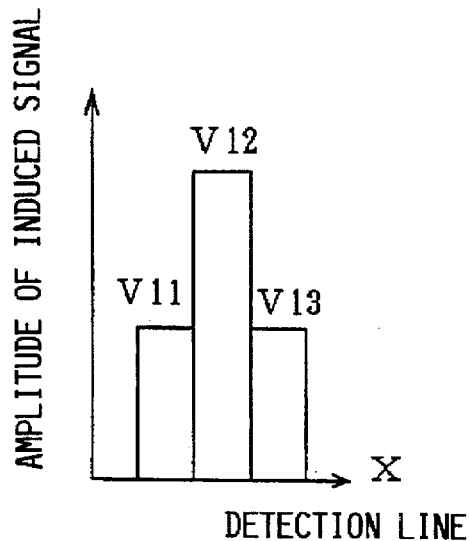
FIG. 18 is an explanatory graph showing an amplitude of an induction signal in the case where a coordinate indicator is placed on L0 of FIG. 17.
Figure 19:
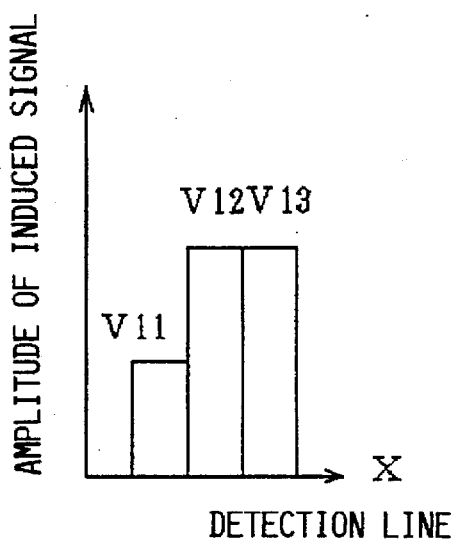
FIG. 19 is an explanatory graph showing an amplitude of an induction signal in the case where the coordinate indicator is placed on L1 of FIG. 17.

FIG. 18 shows the amplitude information s103 of the induction signal generated from the detection lines 311 to 313 in the case where the coordinate indicator 5 is positioned on the intersection of the first loop 301a of the excitation line 301 and a center line L0 of the detection line 312 shown in FIG. 17. FIG. 19 shows the amplitude information s103 of the induction signal generated from the detection lines 311 to 313 in the case where the coordinate indicator 5 is positioned on the first loop 301a of the excitation line 301 as well as on an intermediate line L1 between the detection line 312 and the detection line 313 shown in FIG. 17.

First, a description will be given of a case where the coordinate indicator 5 is positioned on the center line L0 of the detection line 312 shown in FIG. 17. In this example, the amplitude information s103 of the induction signal in the case of selecting the detection lines 311 to 313 are compared in order as V11, V12 and V13. As a result, as shown in the distribution of FIG. 18, the amplitude information V12 of the induction signal in the case of selecting the detection signal 312 is largest, and since a distance between the coordinate indicator 5 and the first loop 311a of the detection line 311 is identical to the coordinate indicator 5 and the detection line 313, the amplitude information V11 and V13 of the induction signals from the detection lines 312 and 313 are equal to each other.

A description will be given of a case where the coordinate indicator 5 is positioned on the line L1 apart from the detection lines 312 and 313 by the same distance. In this example, as shown in the distribution of FIG. 19, the amplitude information V11 and V13 of the induction signals from the detection lines 312 and 313 are made equal to each other because a distance between the coordinate indicator 5 and the detection line 312 is equal to that between the coordinate indicator 5 and the detection line 313.

Here, the coordinates can be calculated by applying the system (Japanese Patent Unexamined Publication No. Sho 55-96411) proposed by the applicants. In other words, calculation defined by the following expression is executed on the basis of the amplitude of the above induction signal.

$$Q = (V_p - V_{p+1})/(V_p - V_{p-1}) \quad \text{(Ex. 1)}$$

where $V_{p+1} > V_{p-1}$

FIG. 20 shows a change of Q shown in Ex. 1 in the case where V12, V11 and V13 are substituted for $V_p$, $V_{p-1}$ and $V_{p+1}$ in the above expression, respectively, and the coordinate indicator 5 is moved from L0 to L1 in parallel with the x-axis. When the coordinate indicator 5 is placed at L0, Q=1 and when the coordinate indicator 5 is placed at L1, Q=0. This is apparent from the above description. When the coordinate indicator 5 is placed between L0 and L1, then Q takes a value in the range of 0<Q<1 corresponding to that position with the relationship of 1 : 1. Therefore, Q is calculated from the distribution of the amplitude information s103 on the induction signal by experimentally obtaining the characteristic of Q in advance, thereby being capable of obtaining an accurate position of the coordinate indicator 5 between L0 and L1 in accordance with Q thus calculated.

As described above, the amplitude information V11, V12 and V13 of the induction signals when the excitation line 301 and the detection lines 311 to 313 are selected as described above contain no induction signal component resulting from the direct electromagnetic coupling between the excitation line and the detection line, and Q calculated from the amplitudes V11, V12 and V13 of the excitation signals is not influenced by the electromagnetic coupling between the excitation line and the detection line.

Subsequently, a description will be given of a case of selecting an excitation line forming one loop. For the simplification of description, a description will be given of an example in which the excitation line 302 is selected.

First, it is assumed that the amplitude information s103 on the induction signals obtained by selecting the excitation line 302 and scanning the detection lines 311 to 314 are V21, V22 and V23 in the stated order. Similarly in this example, Q can be calculated by the above coordinate calculating method. V22 and V23 contain the induction signal component resulting from the direct electromagnetic coupling between the excitation line and the detection lines because the direct electromagnetic coupling occurs between the excitation line 302 and the detection lines 312 to 313. However, since the mutual inductance between the excitation line 302 and the detection lines 311 to 313 is not so large, Q calculated from the amplitudes V21, V22 and V23 of the induction signals is little influenced by the direct electromagnetic coupling between the excitation line and the detection lines. As a result, such a problem that the accuracy in calculation of the coordinates is lowered in the peripheral portion of the coordinate detector body 1d can be solved.

Conversely considering, if the excitation line 301 and the detection line 311 are placed in the peripheral portion of the coordinate detector as in this structure, the invalid region in the peripheral portion thereof can be reduced without any changes in an area of the coordinate detector body, thereby being capable of broadening the readable region.

As described above, a position indicated by the coordinate indicator 5 can be detected with accuracy in accordance with the distribution of the amplitude information s103 of the induction signals obtained by scanning the excitation lines 301 to 304 as well as the detection lines 311 to 314.

Since the object of the invention is to reduce the induction signal component generated by the direct electromagnetic coupling between the excitation line and the detection line, the excitation line and the detection line may be placed so that the mutual inductance between the excitation line and the detection line is reduced. Hence, the present invention is not particularly limited to or by the configuration of the excitation line and detection line including the excitation line and detection line consisting of two loops, and the winding number of the excitation line and detection line as well as an interval at which the excitation line and the detection line are placed.

Figure 5:
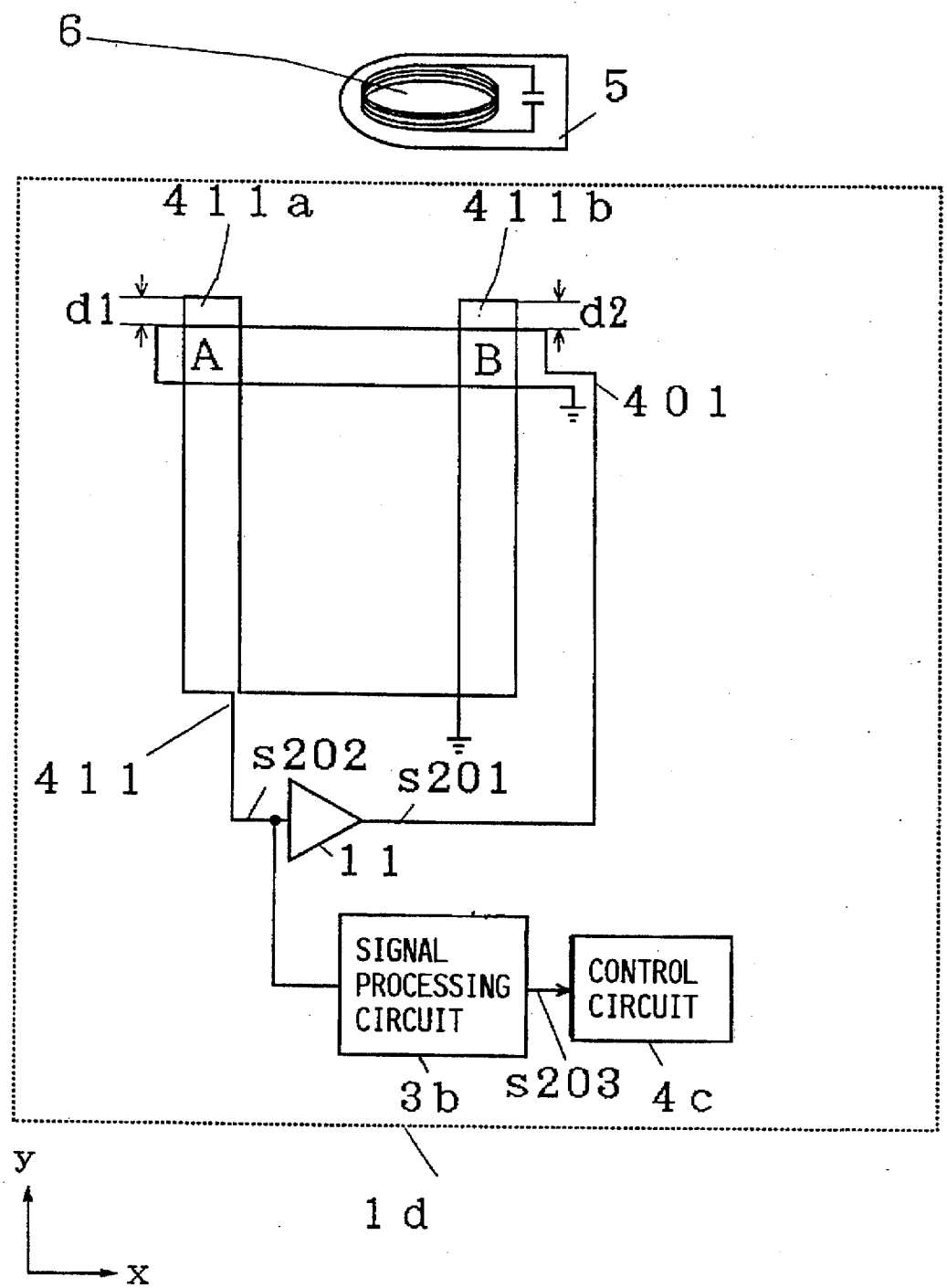
FIG. 5 is a structural diagram showing a coordinate reader with a third structure in accordance with the present invention.

FIG. 5 is a structural diagram showing a coordinate reader with a third structure in accordance with the present invention.

Reference 1d denotes a coordinate detector body; 5, a coordinate indicator including a resonance circuit 6; 11, an amplifying circuit; 3b, a signal processing circuit connected to a second sense line 411 as well as an input of the amplifying circuit 11; and 4c, a control circuit connected to an output of the signal processing circuit 3b.

A first sense line 401 is in the form of one loop and has one end connected to an output of the amplifying circuit 11. A second sense line 411 is comprised of a first loop 411a and a second loop 411b which are in the rectangular form equal in length, width, winding number and so on to each other. An end of the second sense line 411 is connected to an input of the amplifying circuit 11. The structure of the first and second sense lines 401 and 411 are the same as those of the excitation and detection lines described in association with the first structure, and as described above, the mutual inductance between the first sense line 401 and the second sense line 411 is zero.

Reference s201 denotes an output signal ,of the amplifying circuit 11; s202, an input signal of the amplifying circuit 11; and s203, amplitude information on the input signal s202.

The operation of the coordinate reader with the above third structure will be described.

First, in the case where the coordinate indicator 5 is apart from the regions A and B where the loops 411a and of the first and second sense lines 401 and 411 intersect each other, the mutual inductance between the first sense line 401 and the second sense line 411 is zero, and no direct electromagnetic coupling is generated. Therefore, feedback is not made between the input and output of the amplifying circuit 11, and no oscillation occurs.

When the coordinate indicator 5 is made to approach the region A where the first sense line 401 and the loop 411a of the second sense line 411 intersect, the resonance circuit 6 within the coordinate indicator 5 is electromagnetically coupled with the first and second sense lines 401 and 411, thereby constituting a first positive feedback loop having a consecutive path of an output of the amplifying circuit 11, the first sense line 401, the resonance circuit 6, the second sense line 411 and the input of the amplifying circuit 11. As a result, oscillation is generated on the basis of the resonance frequency of the resonance circuit 6. Accordingly, the input signal s202 of the amplifying circuit is converted into the amplitude information s203 in the signal processing circuit 3b, and a position information indicated by the coordinate indicator 5 can be obtained by operating the amplitude information s203 in the control circuit 4.

A description will be given of a case where the coordinate indicator 5 is made to approach the region B where the first sense line 401 and the loop 411b of the second sense line 411 intersect. In this example, since the first and second sense lines 401 and 411 are connected to each other so that the loop direction of the second loop 411b of the second sense line 411 is opposite to the loop direction of the first loop 411a, the phase of the input signal s202 generated from the second sense line is different by 180 degrees from that in the case where the coordinate indicator 5 is made to approach the region A. Hence, a positive feedback loop is not realized between the input and output of the amplifying circuit 11, and no oscillation occurs.

As described above, in the third structure shown in FIG. 5, only in the case where the coordinate indicator 5 is made to approach the first loop 411a of the second sense line 411, the position information on the coordinate indicator 5 can be detected. In the case where the coordinate indicator 5 is made to approach the second loop 411b of the second sense line 411, no position information on the coordinate indicator 5 can be detected.

A description will be given of a fourth structure in which there is provided a phase change-over circuit 12 having a phase inverse function for changing a phase by 180 degrees between the output of the amplifying circuit 11 and the first sense line 401 in addition to the above third structure, with reference to FIG. 6.

Figure 6:
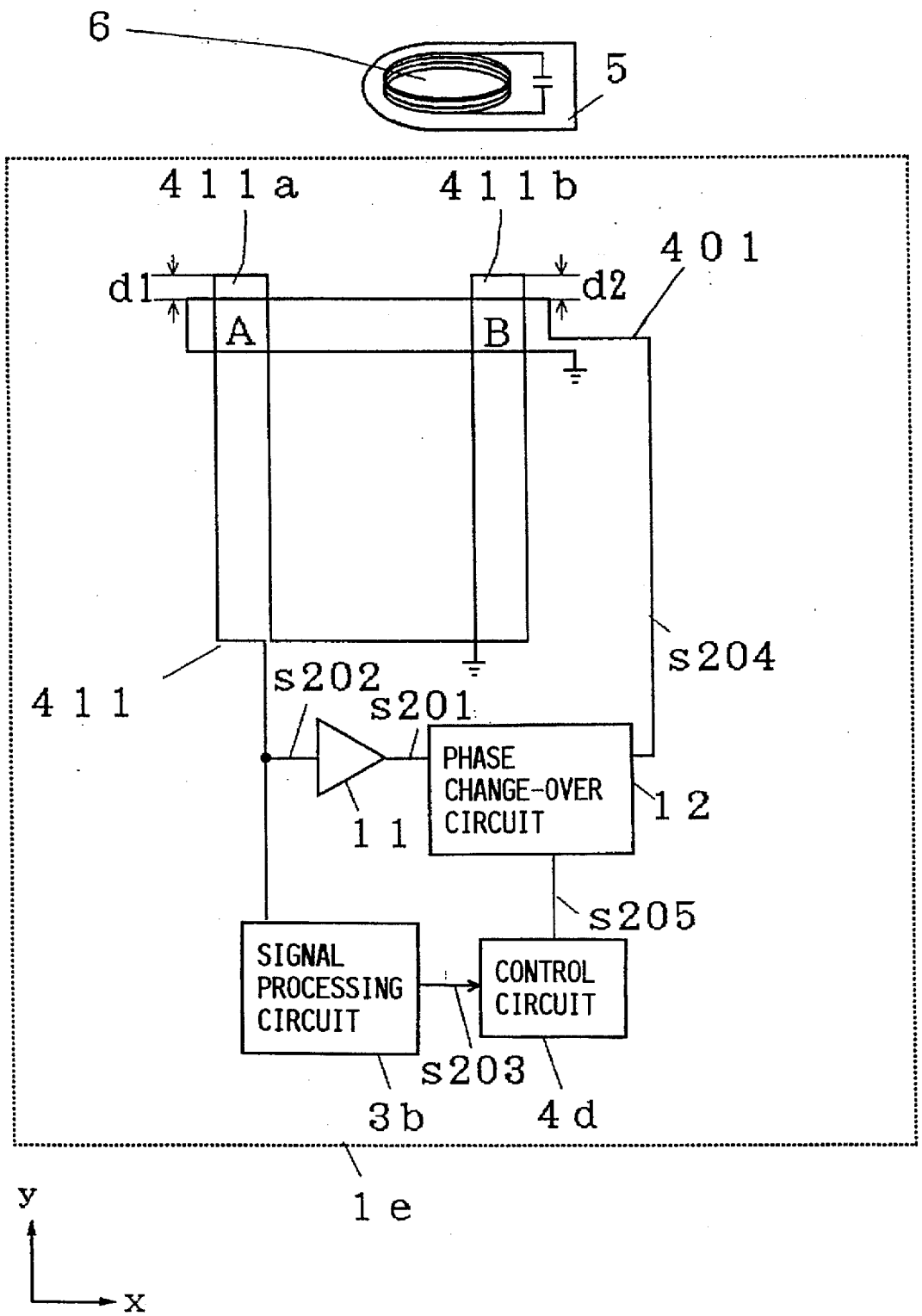
FIG. 6 is a structural diagram showing a coordinate reader with a fourth structure in accordance with the present invention.

In FIG. 6, reference numeral 11 denotes an amplifying circuit; 3b, a signal processing circuit connected to a second sense line 411 as well as an input of the amplifying circuit 11; and 4d, a control circuit which controls the phase change-over circuit 12, and is connected to an output of the signal processing circuit 3b to have a function of detecting a position information on the coordinate indicator 5 to be described later.

Figure 10:
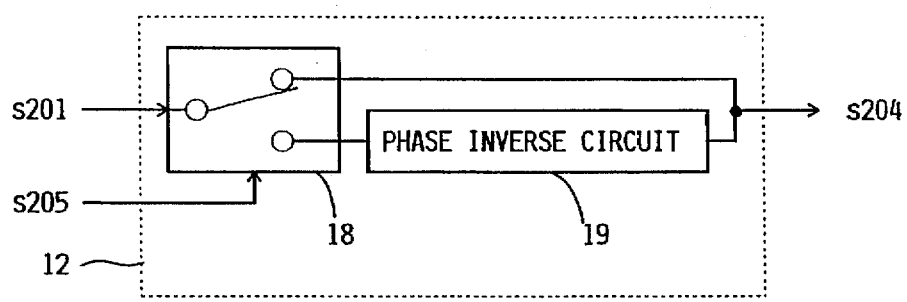
FIG. 10 is a structural diagram showing a phase change-over circuit in accordance with the present invention.

Reference numeral 12 denotes a phase change-over circuit having the structure shown in FIG. 10, which consists of a phase change-over switch 18 and a phase inverse circuit 19. The phase change-over circuit 12 has a function of changing over the phase of the output signal s201 to two states of inversion and non-inversion in accordance with the phase change-over signal s205 outputted from the control circuit 4.

The first and second sense lines 401 and 411 are the same in structure as those of the sense lines in the above third structure, and placed so that the total mutual inductance of the first and second sense lines 401 and 411 is zero.

Subsequently, the operation of the coordinate reader with the fourth structure will be described.

First, in the case where the coordinate indicator 5 is apart from the regions A and B where the loops 411a and 411b of the first and second sense lines 401 and 411 intersect each other, feedback is not made between the input and output of the amplifying circuit 11, and no oscillation occurs.

When the coordinate indicator 5 is made to approach the region A where the first sense line 401 and the loop 411a of the second sense line 411 intersect, the phase change-over signal s205 outputted from the control circuit 4d is 0, and the phase change-over circuit 12 makes the output signal in the non-inversion state so that the input signal s202 and the oscillation signal s204 are in phase. In this situation, the resonance circuit 6 within the coordinate indicator 5 is coupled with the first and second sense lines 401 and 411, thereby constituting a first positive feedback loop having a consecutive path which consists of an output of the amplifying circuit 11, the phase change-over circuit 12, the first sense line 401, the resonance circuit 6, the second sense line 411 and the input of the amplifying circuit 11. As a result, oscillation is generated on the basis of the resonance frequency of the resonance circuit 6. The above operation is nearly identical to that in the third structure.

In the case where the coordinate indicator 5 is made to approach the region B where the first sense line 401 and the second loop 411b of the second sense line 411 intersect, the phase of the input signal s202 generated from the second sense line 211 is different by 180 degrees from that in the case where the coordinate indicator 5 is made to approach the region A where the first sense line 401 and the first loop 411a of the second sense line 411 intersect. Hence, conditions under which a positive feedback loop is oscillated are not satisfied. Under those circumstances, the phase change-over signal s205 is outputted from the control circuit 4d as "1" so that the phase change-over switch 18 contained in the phase change-over circuit 12 shown in FIG. 10 is changed over, thereby outputting the output signal s201 through the phase inverse circuit 19. Thus, the phases of the oscillation signal s204 and the output signal s201 are different by 180 degrees, which is in the inverse state. As a result, this constitutes a second feedback loop having a consecutive path consisting of an output of the amplifying circuit 11, the phase change-over circuit 12, the first sense line 401, the resonance circuit 6, the second sense line 411 and the input of the amplifying circuit 11. Thus, oscillation is generated on the basis of the resonance frequency of the resonance circuit 6.

As described above, by appropriately changing over the state of the phase change-over circuit 12, the oscillation conditions can be realized even if the coordinate indicator 5 approaches any one of the regions A and B. Moreover, by obtaining the phase change-over signal s205 and the amplitude signal s203 of the input signal s202, the control circuit 4d enables the loop position that the coordinate indicator 5 approaches to be discriminated. In other words, the control circuit 4d judges that the coordinate indicator 5 approaches the first loop 411a of the first sense line if oscillation is generated when the phase change-over signal s205 is 0, and that the coordinate indicator 5 approaches the second loop 411b of the first sense line 411 if oscillation is generated when the phase change-over signal s205 is 1.

A process of obtaining the amplitude information s203 on the input signal s102 from the input signal s102 is the same as the operation of the above-mentioned third structure, and therefore its description will be omitted. In control circuit 4d, a position information indicated by the coordinate indicator 5 can be obtained by operating the amplitude information s203 on the input signal and the phase change-over signal s205.

Figure 7:
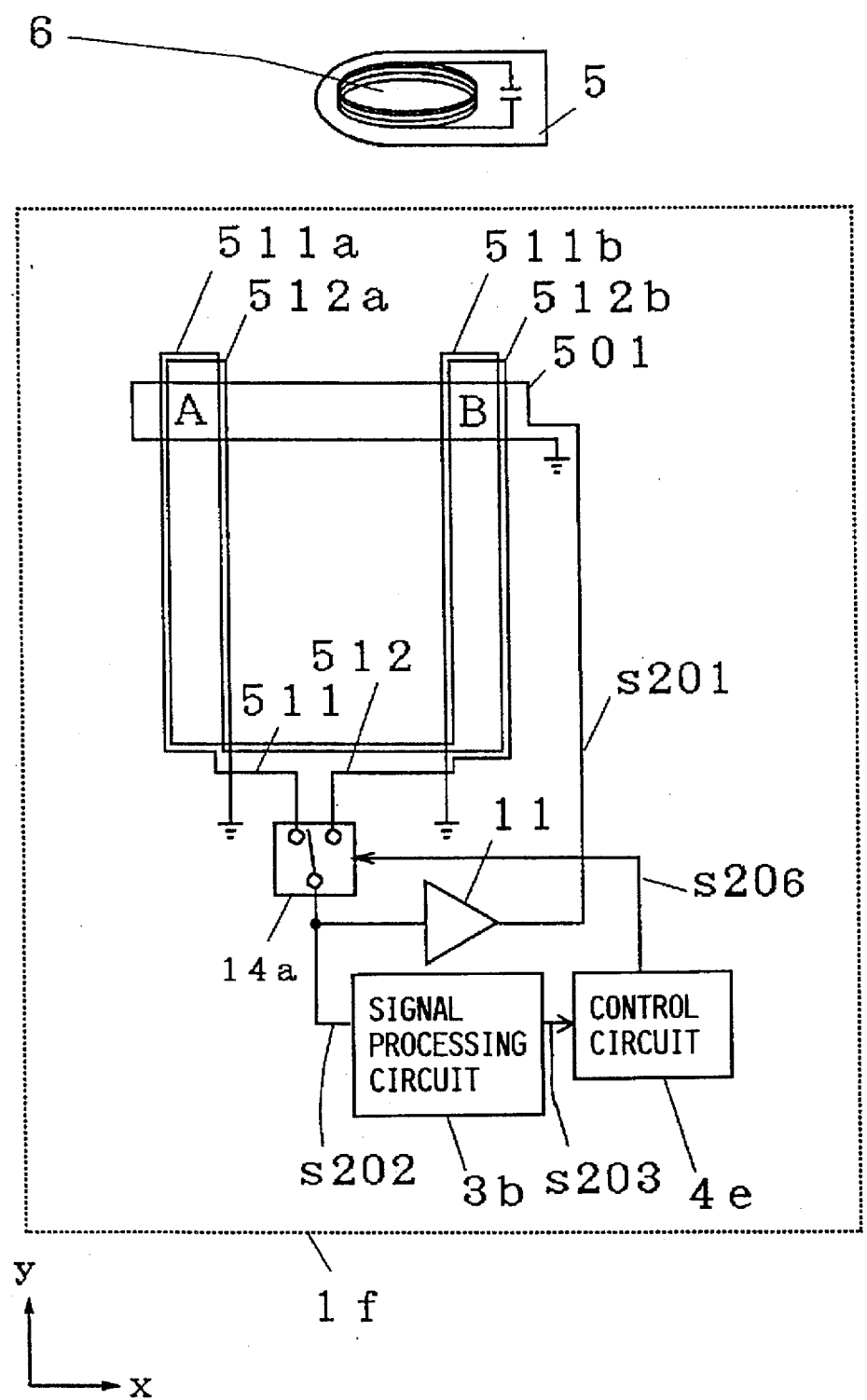
FIG. 7 is a structural diagram showing another example of the coordinate reader with the third structure in accordance with the present invention.

Next, another example of the coordinate reader with the third structure will be described with reference to FIG. 7.

In this structure, a third sense line 512 having a loop which is equal in length, width, winding number to each loop of the second sense line 511 is provided in the vicinity of the second sense line 511 so that the oscillation conditions are satisfied even though the coordinate indicator 5 approaches the region B. A second scanning circuit 14a is arranged between one ends of the second and third sense lines 511 and 512 and the signal processing circuit 3b. In this structure, the third sense line 512 is arranged such that the oscillation conditions are satisfied by forming a positive feedback loop having a consecutive path which passes an output of the amplifying circuit 11, the first sense line 501, the resonance circuit 6, the third sense line 512, the second scanning circuit 14a and an input of the amplifying circuit 11, even if the coordinate indicator 5 is made to approach the region B. Hence, it can be discriminated whether the coordinate indicator 5 approaches the region A or the region B by obtaining the selection signal s206 of the second scanning circuit 14a and the amplitude signal s203 of the input signal s202 through the control circuit 4e. Other operation of this structure is the same as that of the third structure. The advantage of this structure over the fourth structure resides in that there is particularly no need of a phase inverse circuit.

However, the increased numbers of sense lines and switches for the scanning circuits are required.

Also, in the third and fourth structures, the first sense line may be constituted by connecting two loops. Further, all of the sense lines may be constituted by connecting two loops, respectively.

The third and fourth structures exhibit the principle of the structure in accordance with the present invention. Accordingly, in order to detect the coordinates of the two-dimensional position indicated by the coordinate indicator as in the general coordinate reader, it is required to develop the above third and fourth structures so as to place a plurality of sense lines in the x- and y- directions in the x, y orthogonal coordinate system, respectively. With such a development, the x- and y- coordinates are calculated in accordance with the distribution of the amplitude of the input signal generated from each sense line to the positive feedback loop.

Figure 8:
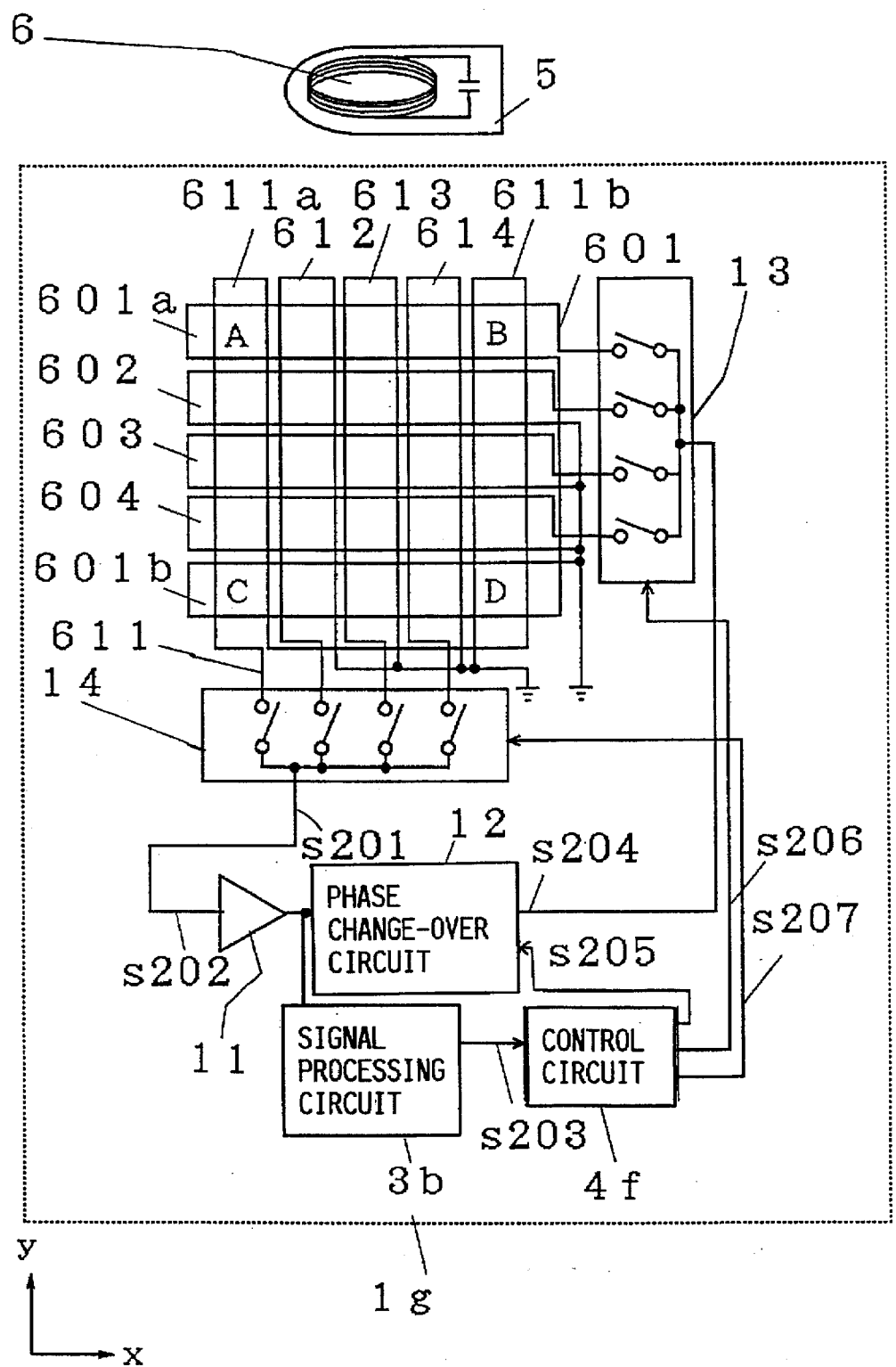
FIG. 8 is a structural diagram showing a coordinate reader in accordance with a second embodiment of the present invention.

FIG. 8 is a structural diagram showing a coordinate reader in accordance with the second embodiment to which the fourth structure is applied.

Reference 4f denotes a control circuit; 11, an amplifying circuit; 12, a phase change-over circuit connected to an output of the amplifying circuit 11; 3b, a signal processing circuit connected to the output of the amplifying circuit 11; 13, a first scanning circuit connected to an output of the phase change-over circuit 12 for sequentially connecting sense lines (hereinafter referred to as "first sense lines") 601 to 604 of a first sense line group; and 14, a second scanning circuit connected to an input of the amplifying circuit 11 for sequentially connecting sense lines. (hereinafter referred to as "second sense lines") 611 to 614 of a second sense line group. The above components are contained in the coordinate detector body 1g. Reference numeral 5 denotes a coordinate indicator having a resonance circuit 6 therein.

The first sense lines 601 to 604 and the second sense lines 611 to 614 are placed in the same manner as that of the excitation lines 301 to 304 and the detection lines 311 to 314 in the first embodiment shown in FIG. 4. Therefore, the mutual inductance of the first sense line 601 and the second sense line 611 to 614 and the mutual inductance of the first sense line 601 to 604 and the second sense line 611 are zero, respectively.

Reference s201 denotes an output signal of the amplifying circuit 11; s202, an input signal of the amplifying circuit 11; s203, amplitude information on the input signal s202; s204, an oscillation signal; s205, a phase change-over signal for controlling the phase change-over circuit 12; s206, a selection signal for selecting the first sense lines 601 to 604; and 207, a selection signal for selecting the second sense lines 611 to 614.

An operation of the coordinate reader in accordance with this embodiment will be described below.

The first scanning circuit 13 sequentially selects the first sense lines 601 to 604 in accordance with the selection signal s206 outputted from the control circuit 4f. Simultaneously, the second scanning circuit 14 sequentially selects the second sense lines 611 to 614 in accordance with the selection signal s207 outputted from the control circuit 4f. Then, the control circuit 4f outputs the phase change-over signal s205 to the phase change-over circuit 12 on the basis of a table shown in FIG. 23, thereby being capable of obtaining the distribution of amplitude of the input signal s202.

Similarly, in this embodiment, a process of obtaining the amplitude information s203 on the input signal s102 from the input signal s102 is the same as the operation of the above-mentioned third structure, and therefore its description will be omitted.

A method of determining a loop position that the coordinate indicator 5 approaches will be described below.

A signal corresponding to the loop position information s105 of the first embodiment is a phase change-over signal s205. The control circuit 4f calculates the distribution of the amplitude information s203 on the induction signal and the phase change-over signal s205, thereby being capable of determining the loop position that the coordinate indicator 5 approaches as in the first embodiment. Thus, the position of the coordinate indicator 5 can be roughly obtained. The regions 11, 15, 51 and 55 in FIG. 12 in accordance with the first embodiment correspond to the addresses A, B, C and D in FIG. 8. Those addresses are comprised of a differential sense line consisting of paired first and second loops 601a and 601b and a differential sense line consisting of paired first and second loops 611a and 611b. Therefore, there remains a problem on the distinction between the addresses A and D as well as misrecognition of the coordinate indicator 5 due to the shift of a phase by 180 degrees. However, the distinction of two addresses can be made by the same process as that in the first embodiment, and mis-recognition can be also prevented, thus solving those problems.

A method of calculating the detailed coordinates is the same as that in the first embodiment, and therefore its description will be omitted.

From the above result, similarly in this embodiment, a problem can be solved that the accuracy in calculation of the coordinates is lowered in the peripheral portion of the coordinate detector body 1g as described in association with the foregoing background portion. Also, the invalid region in the peripheral portion thereof can be reduced without any changes in an area of the coordinate detector body, thereby being capable of broadening the readable region.

Hereinafter, a description will be given of the detailed embodiment, mainly, a method of distinguishing two addresses which are comprised of differential sense lines, which are represented by the distinction between the addresses A and D shown in FIG. 8 in accordance with the second embodiment.

Figure 24:
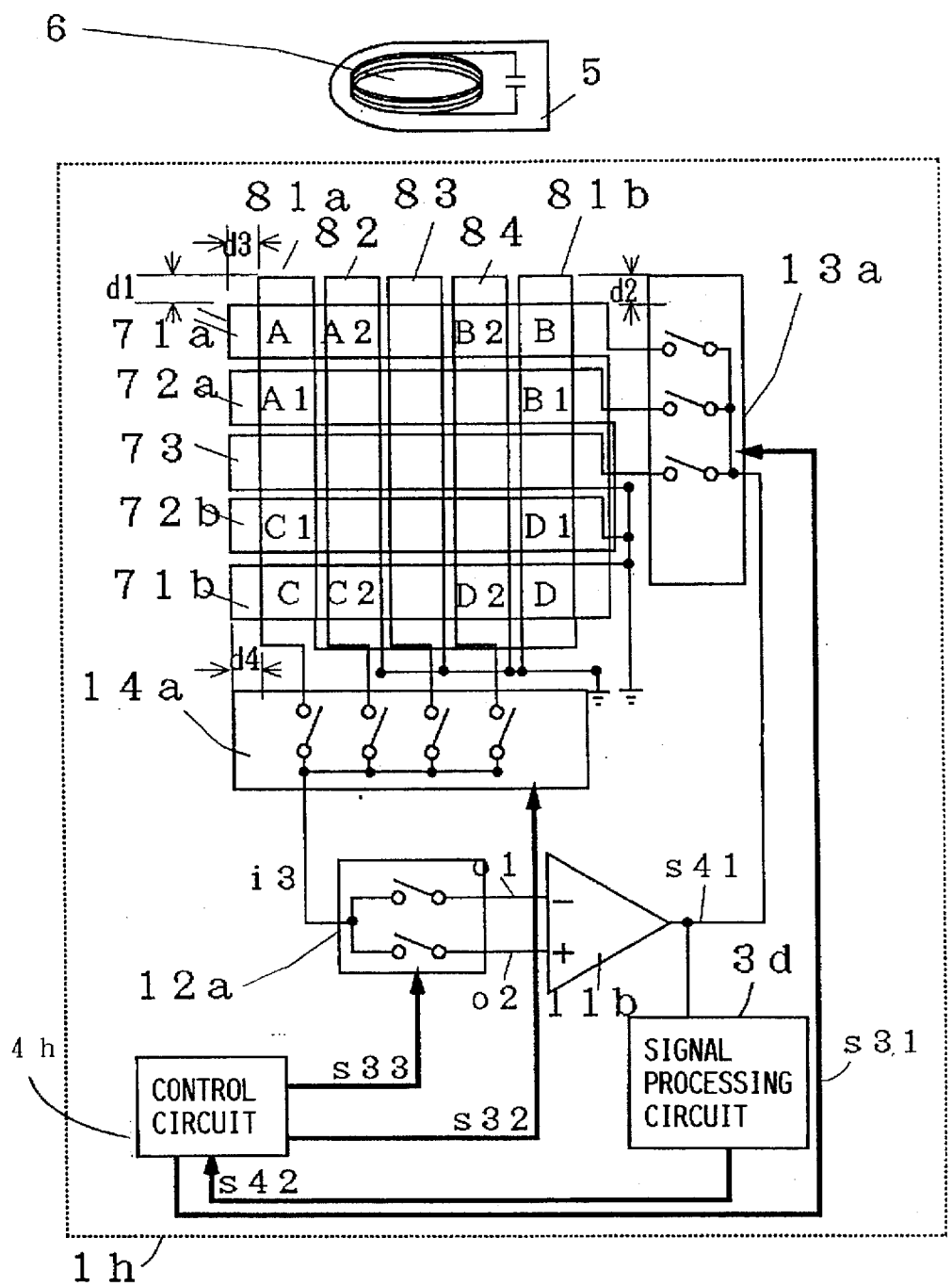
FIG. 24 is a structural diagram showing a coordinate reader with a fifth structure in accordance with a third embodiment of the present invention.

The third embodiment will be described as a variation of the second embodiment according to the invention with reference to FIGS. 24 to 29. FIG. 24 is a structural diagram showing a coordinate reader with a fifth structure in accordance with the present invention.

In this embodiment, the structure of first sense line groups 71 to 73, a first scanning circuit 13a, a phase change-over circuit 12a, and an amplifying circuit 11b are different in structure from those in the second embodiment. Other components are identical to those in the second embodiment. The respective reference numerals are renumbered.

The coordinate reader body 1h is provided with the first sense line groups 71 to 73, the second sense line groups 81 to 84, the first scanning circuit 13a, the second scanning circuit 14a, the phase change-over circuit 12a, the amplifying circuit 11b, the signal processing circuit 3d and the control circuit 4h.

The first sense line groups 71 to 73 are comprised of a differential sense line 71 formed by connecting two loops 71a and 71b in series, the loop directions of which are opposite to each other, a differential sense line 72 formed by connecting two loops 72a and 72b in series, the loop directions of which are opposite to each other, and a sense line 73 consisting of a single loop. As shown in the figure, the direction of the loops 71b and 72b is opposite to that of other sense lines. The second sense line groups 81 to 84 are comprised of a differential sense line 81 formed by connecting two loops 81a and 81b in series, the loop directions of which are opposite to each other, and sense lines 82 to 84 each consisting of a single loop. As shown in the figure, the direction of only the loop 81b is opposite to that of other sense lines. The first and second sense line groups 71 to 73 and 81 to 84, which are orthogonally placed, have return portions of distances d1 to d4 of 5 mm or less being equal to each other.

One ends of the first and second sense line group groups 71 to 73 and 81 to 84 are grounded, respectively, whereas the other ends thereof are connected to the first and second scanning circuits 13a and 14a, respectively.

The first scanning circuit 13a and the second scanning circuit 14a are comprised of a plurality of electronic switch elements such as analog switches, respectively, and one terminals of the respective switch elements are connected to each other to provide a common terminal every scanning circuit. In detail, an analog switch IC, CD4051, an FET 2SK1581 and the like can be used for that circuit. One of the switch elements in each of the scanning circuits is closed by the selection signals s31 and s32 given from the control circuit 4h to be described later, so that one ends of the switch elements are connected to the common terminal.

The common terminal of the first scanning circuit 13a is connected to the output of the amplifying circuit 11b. The common terminal of the second scanning circuit 14a is connected to the phase change-over circuit 12a.

Figures 25, 26:
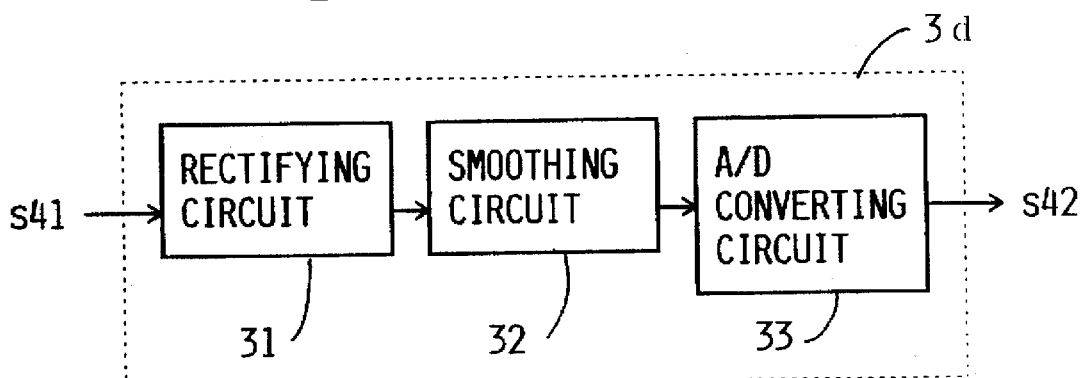
FIG. 25 is a structural diagram showing a signal processing circuit in the coordinate reader in accordance with the third to sixth embodiments of the present invention.
FIG. 26 is a table showing a relationship between selection signals of a first scanning circuit and selected sense lines in the coordinate reader in accordance with the third embodiment of the present invention.

For assisting the later description, the functions of those circuits are shown by tables in FIGS. 26 and 27, and will be described in detail. Those tables are one example for description, and their functions are not limited to or by only those tables (likewise, this is also applied to tables which will be described later). In the tables, only reference symbols are shown as the names of signals.

The first and second sense line selection signals s31 and s32 are represented, for example, by binary numeral values due to a plurality of signal conductors. The binary numeral values are given to the signal conductors so that corresponding sense lines are selected. For example, in FIG. 26, if "2" is given thereto as the first sense line selection signal s31, then the sense line 73 is selected.

The phase change-over circuit 12a is arranged to form a positive feedback loop when the resonance circuit exists in the vicinity of the sense line with respect to all the combinations of the sense lines. The structure of the phase change-over circuit 12a is of a switch of 1-input to 2-outputs so that the input terminal is alternately switchably connected to the respective output terminals. The arrangement of the circuit depends on the elements used, and the invention is not limited to or by that circuit. Also, in this example, the phase change-over circuit 12a is connected to the input of the amplifying circuit, however, it goes without saying that the phase change-over circuit 12a may be provided to the output of the amplifying circuit as in the second embodiment. The function of that circuit is shown in FIG. 28.

In the phase change-over circuit 12a of FIG. 24, reference i3 denotes an input terminal, and o1 and o2 are output terminals.

The amplifying circuit 11b is an amplifying circuit having a difference input with a plus (+) input and a minus (−) input, and the phase change-over circuit 12a is connected to the plus input and minus input of the amplifying circuit 11b. In this embodiment, the amplifying circuit having the difference input is used. However, this circuit is used for switching over the input phase, and the present invention is not limited to or by the amplifying circuit having the difference input.

The relationship between the phase and the loop of the sense line in this embodiment will be described below. In the first and second sense line groups 71 to 73 and 81 to 84, the directions of loops in each of the sense line groups are equal to each other except for the loops 71b, 72b and 81b of the differential sense lines. A closed loop is formed by the first sense line groups 71 to 73, the resonance circuit 6, the second sense line groups 81 to 84, and the amplifying circuit 11b. Oscillation of the closed loop is set as follows: In other words, the second sense line groups 82 to 84 except for the differential sense line 81 are connected to the minus input of the amplifying circuit 11b, and the first sense line 73 except for the differential sense lines 71 and 72 are connected to the output of the amplifying circuit 11b. In this situation, when the resonance circuit 6 exists in the vicinity of those sense lines, the closed loop is formed and oscillated.

The differential sense line 81 are connected to the minus input of the amplifying circuit 11b, and the differential sense lines 71 or 72 is connected to the output of the amplifying circuit 11b. In this situation, when the resonance circuit 6 exists in the vicinity of the address A defined by the loops 71a and 81a and the address D defined by the loops 71b and 81b, or the address A1 defined by the loops 72a and 81a and the address D1 defined by the loops 72b and 81b, the closed loop is formed and oscillated.

The differential sense line 81 are connected to the plus input of the amplifying circuit 11b, and the differential sense line 71 or 72 is connected to the output of the amplifying circuit 11b. In this situation, when the resonance circuit 6 exists in the vicinity of the address B defined by the loops 71a and 81b and the address C defined by the loops 71b and 81a, or the address B1 defined by the loops 72a and 81b and the address C1 defined by the loops 72b and 81a, the closed loop is formed and oscillated. In other words, in this case, the paired addresses A and D, A1 and D1, B and C, and B1 and C1 are simultaneously selected, and those paired addresses are not separated.

The signal processing circuit 3d allows the oscillation signals s41 generated in the positive feedback loop to be rectified, smoothed and A/D converted, thereby outputting the amplitude information on the oscillation signal s41 corresponding to the position indicated by the coordinate indicator 5 as a digital value to the control circuit 4h. As shown in FIG. 25, because the signal processing circuit 3d is connected to the output of the amplifying circuit 6 in this embodiment, it is comprised of the rectifying circuit 31, the smoothing circuit 32 and the A/D converting circuit 33.

The control circuit 4h is connected so as to supply the selection signals s31 to s33 to the first scanning circuit 13a, the second scanning circuit 14a and the phase change-over circuit 12a, respectively. The control circuit 4h calculates the position indicated by the coordinate indicator 5 by use of the amplitude information on the oscillation signal which has been converted into a digital value through the A/D converting circuit 33, and the selection signals s31 to s33 given to the first and second scanning circuits 13a and 14a and the phase change-over circuit 12a.

An operation of distinguishing the above two addresses will be described.

As described above, the case where two addresses cannot be separated from each other is limited to a case where the differential sense lines are simultaneously selected in the first and second sense lines.

Figure 29:
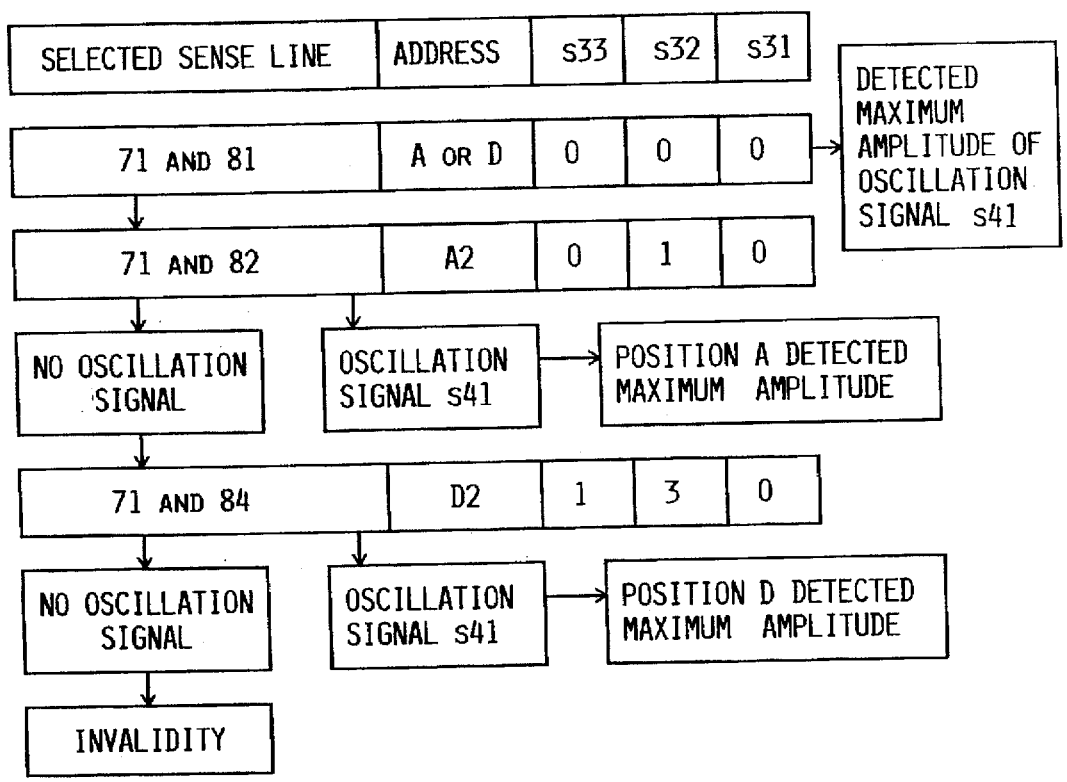
FIG. 29 is a flowchart showing the operation of the coordinate reader in accordance with the third embodiment of the present invention.

For example, FIG. 29 shows a flowchart of the operation in the case where the differential sense lines 71 an 81 are selected simultaneously, and the maximum amplitude of the oscillation signal s41 is detected when the phase inverse signal s33 is "0". Hereinafter, a description is given of the distinguishing operation in accordance with the flowchart of FIG. 29. In the method of determining the maximum amplitude of the oscillation signal s41, for example, in the present invention, all of the sense lines are selected in the smaller order of the selection signals of the sense line, and the oscillation signal detected every sense line is compared to obtain the maximum amplitude. This order of operation is one example, and the present invention is not limited to or by this case.

It is assumed that the differential sense lines 71 and 81 are selected simultaneously, and the maximum amplitude of the oscillation signal s41 is detected when the phase inverse signal s33 is "0". In this situation, the resonance circuit 6 of the coordinate indicator 5 is in the vicinity of the detection address A or D. First of all, the address A2 adjacent to the address A is selected. In this state, the selection signals s33, s31 and s32 are "0", "0" and "1", respectively. In this situation, if the oscillation signal s41 is detected, the position of the coordinate indicator 5 is also in the vicinity of the address A2. For that reason, the address where the maximum amplitude of the oscillation signal s41 is detected is A. If no oscillation signal s41 is detected, there is the possibility that the position of the coordinate indicator 5 is the address D. Subsequently, the address D2 adjacent to the address D is detected. Since the direction of the loop 71b is opposite to that of the loop 71a, the selection signals s33, s31 a s32 are "1", "0" and "3", respectively. In this situation, if the oscillation signal s41 is detected, the address where the maximum amplitude of the oscillation signal s41 is detected is D. If the oscillation signal s41 is not detected, the maximum amplitude of the oscillation signal is invalid. This manner is similarly applied to the discrimination of two other addresses. This judging process may be executed by the step where the address D2 is first selected and then the address A2 is selected.

Also, in this embodiment, for example, the gain of the positive feedback loop is previously adjusted so that no oscillation signal s41 cannot be detected at the address D2 when the maximum amplitude of the oscillation signal s41 is obtained at the address A.

As described above, when the differential sense lines are selected in selection of the first and second sense line groups 71 to 73 and 81 to 84, if the maximum amplitude of the oscillation signal s41 is detected, the address can be identified by the presence or absence of the oscillation signal at an address which is not defined by the differential sense lines, adjacent to said address.

Further, as in the first embodiment, as to the problem that the address at which the oscillation signal s41 is detected is mis-recognized by shifting the phase by 180 degrees with the extreme inclination of the coordinate indicator 5, the mis-recognition could be prevented by the method of investigating the oscillation signal s41 at the address which is defined by the sense lines each consisting of one loop adjacent to the differential sense lines.

As described above, with the sense line thus selected, not only two addresses could be readily separated but also mis-input of the coordinates could be prevented.

From the above result, similarly in this embodiment, such a problem can be solved that the accuracy in calculation of the coordinates is lowered in the peripheral portion of the coordinate detector body 1h as described in association with the foregoing background portion. Also, the invalid region in the peripheral portion thereof can be reduced such that all of the distances d1 to d4 of the return portions at four sides of the sense lines shown in FIG. 24 are 5 mm or less, without any changes in an area of the coordinate detector body, thereby being capable of broadening the readable region.

Now, a description will be given of some variations of the above-mentioned structure.

Without limiting to this embodiment, the coordinate reader can be arranged such that one differential sense line is disposed in only one direction of the x- or y- direction whereas any number of differential sense lines are used in the other direction, and the address at which the oscillation signal s41 is detected can be discriminated by the foregoing method. Also, the coordinate reader can be arranged such that two differential sense lines are disposed to interpose at least one sense line consisting of one loop in only one direction of the x- or y- direction therebetween, and any number of differential sense lines are used in the other direction.

The signal processing circuit 3d is connected to the output of the amplifying circuit 11d in FIG. 24. However, as described above, the signal processing circuit 3d may be connected to another circuit on demand, so long as it can input the oscillation signal s41.

In the structure shown in FIG. 24, the first and second sense line groups have 5 loop units, respectively. However, the number of sense lines may be designed so as to be arbitrarily increased or decreased in accordance with the position calculation range. The present invention, without limiting to the detectable range, can be put into a practice in a wide range of from a position input apparatus which is called a compact tablet to a position input apparatus which is called a large-sized digitizer.

Further, in FIG. 24, the distances d1 to d4 of the return portions of the sense lines are 5 mm or less. However, this distance is not limited to 5 mm. It is apparent that, even though the distances are more than 5 mm, the structure is effective even to a case where the direct electromagnetic coupling occurs between the sense lines.

Figure 30:
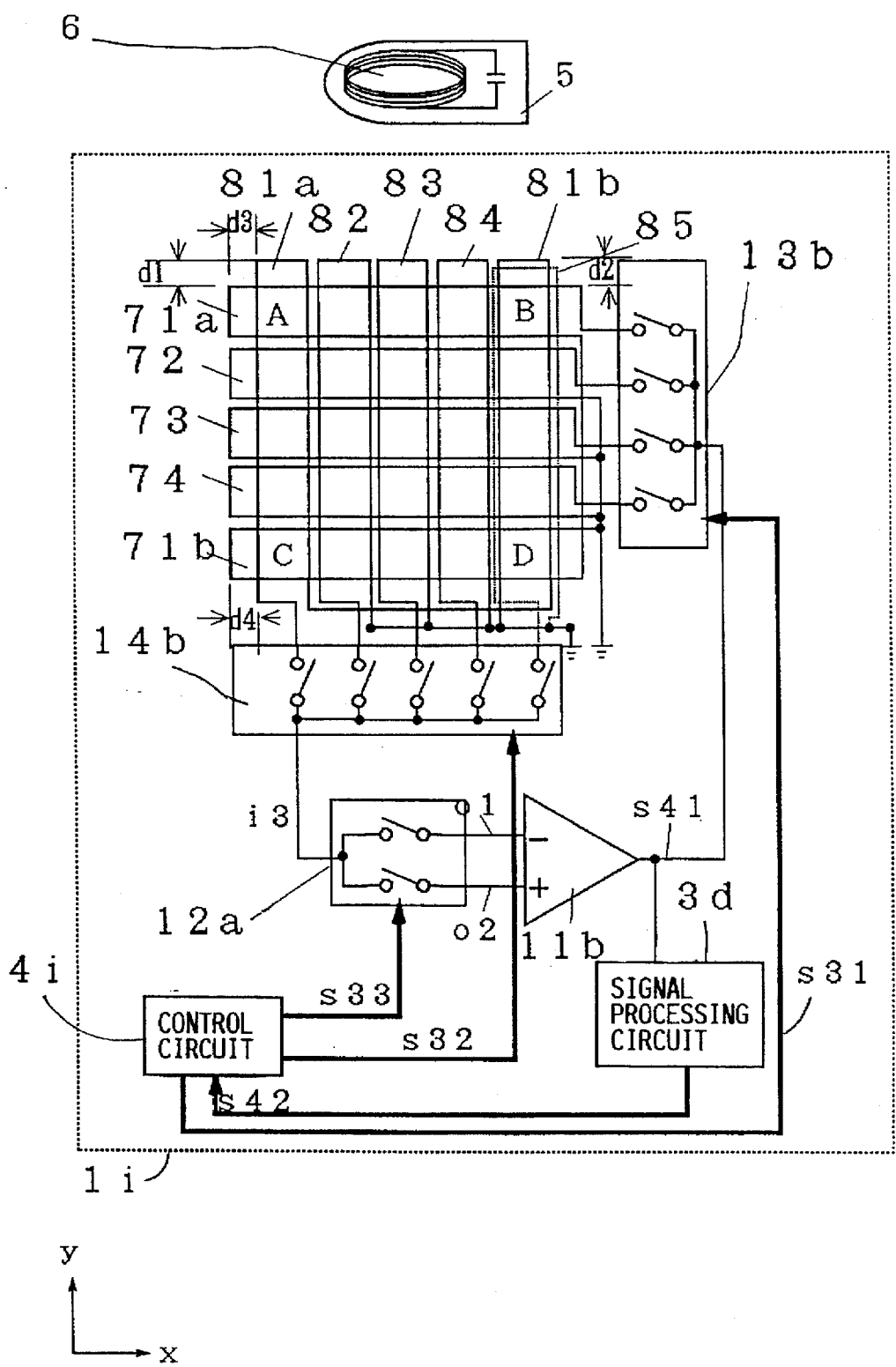
FIG. 30 is a structural diagram showing a coordinate reader with a sixth structure in accordance with the fourth embodiment of the present invention.
Figure 33:
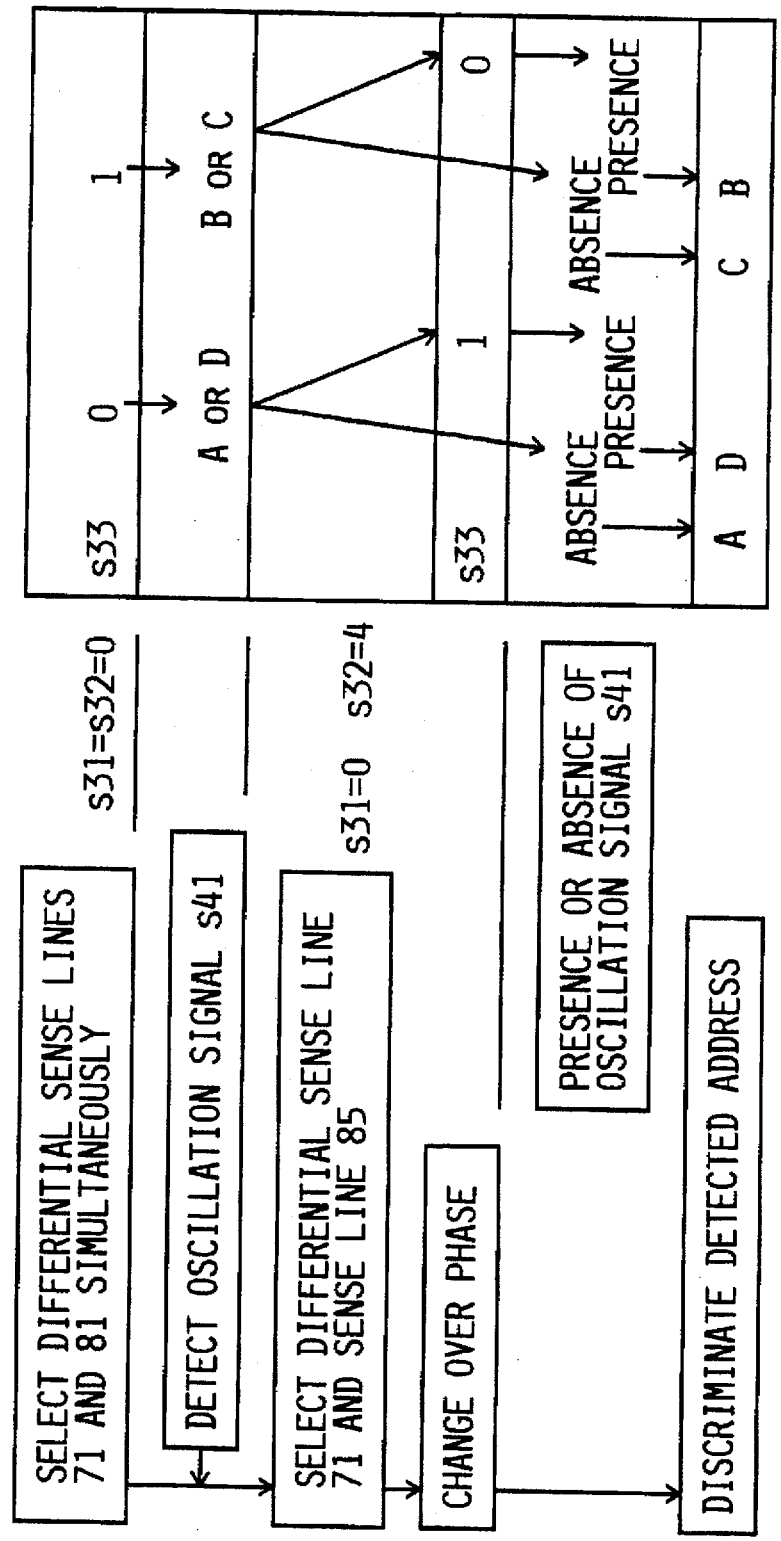
FIG. 33 is a flowchart showing the operation of the coordinate reader in accordance with the fourth embodiment of the present invention.

A fourth embodiment of the present invention will be described with reference to FIGS. 30 to 33. FIG. 30 is a structural diagram showing a coordinate reader with a sixth structure in accordance with the present invention.

In this embodiment, the sense lines 72 and 74 of the first sense line groups 71 to 74, the sense lines 85 of the second sense line groups 81 to 85, the first scanning circuit 13b, and the second scanning circuit 14b are different from the structure of the foregoing third embodiment. Other structure is identical to that of the third embodiment.

The sense line 71 is a differential sense line having the loops 71a and 71b connected in series, the loop directions of which are opposite to each other. The loop 71a has the same loop direction as that of the loops 72 to 74. The sense line 81 is a differential sense line having the loops 81a and 81b connected in series, the loop directions of which are opposite to each other. The loop 81a has the same loop direction as that of the loops 82 to 84. The loops 81a and 81b have the same loop configuration as that of other sense lines. The sense line 85 is slightly different in configuration from other sense lines of the second sense line group, and larger than the configuration of the loop 81b. However, the distance represented by d2, of the return portion of the sense line is equal to the distance of the return portion of other sense lines 81 to 84. The sense line 85 is used to judge whether the coordinate indicator 5 having the resonance circuit 6 therein exists in the vicinity of the loop 81b, or not.

As in the third embodiment, the first scanning circuit 13b is comprised of a plurality of electronic switch elements such as analog switches, and one terminals of the respective switch elements are connected to each other to provide a common terminal. Here, the number of switches is 4. The second scanning circuit 14b is identical in structure to the first scanning circuit 13b, however, the number of switches is 5.

The functions of those circuits which are different from those in the third embodiment are shown in tables of FIGS. 31 and 32. These tables are one example for description, and the functions are not limited to or by only these tables. In the tables, only reference symbols are represented for the names of signals.

The phase change-over circuit 12a and the amplifying circuit 11b are the same as those in the third embodiment. Although the phase change-over circuit 12a is connected to the input of the amplifying circuit 11b, it may be connected to the output of the amplifying circuit 11b as in the second embodiment. Similarly, in this embodiment, the amplifying circuit having the difference input is used. However, the present invention is not limited to or by the amplifying circuit having the difference input.

The relationship between the phase and the loop of the sense line in this embodiment will be described below. In the first and second sense line groups 71 to 74 and 81 to 85, the directions of loops in each of the sense line groups are equal to each other except for the loops 71b and 81b of the differential sense lines. A closed loop is formed by the first sense line groups 71 to 74, the resonance circuit 6, the second sense line groups 81 to 85, and the amplifying circuit 11b. The closed loop is set as follows: In other words, the second sense line groups 82 to 85 except for the differential sense line 81 are connected to the minus input of the amplifying circuit 11b, and the first sense lines 72 to 74 except for the differential sense line 71 are connected to the output of the amplifying circuit 11b. In this situation, when the resonance circuit 6 exists in the vicinity of those sense lines, the closed loop is formed and oscillated.

The differential sense line 81 are connected to the minus input of the amplifying circuit 11b, and the differential sense line 71 is connected to the output of the amplifying circuit 11b. In this situation, when the resonance circuit 6 exists in the vicinity of the address A defined by the loops 71a and 81a and the address D defined by the loops 71b and 81b, the closed loop is formed and oscillated.

The differential sense line 81 are connected to the plus input of the amplifying circuit 11b, and the differential sense line 71 is connected to the output of the amplifying circuit 11b. In this situation, when the resonance circuit 6 exists in the vicinity of the address B defined by the loops 71a and 81b and the address C defined by the loops 71b and 81a, the closed loop is formed and oscillated. In other words, in such a case, the paired addresses A, D and B, C are simultaneously selected, and those paired addresses are not separated.

The signal processing circuit 3d allows the oscillation signals s41 of FIG. 30 to be rectified, smoothed and thereafter A/D converted into a digital value. The control circuit 4i calculates the position indicated by the coordinate indicator 5 by use of the amplitude information on the oscillation signal thus converted, and the selection signals s31 to s33 given to the first and second scanning circuits 13b and 14b and the phase change-over circuit 12a.

An operation of the coordinate reader in accordance with this embodiment will be described. The case where two addresses cannot be separated from each other is limited to a case where the differential sense lines are simultaneously selected by the first and second sense lines. The operation of the coordinate reader in the case where a plurality of differential sense lines are selected simultaneously to detect the oscillation signal s41 is shown by a flowchart and selection signals as well as judgement results along the flowchart in FIG. 33. A description will be given of a scanning operation for separating two addresses along the flowchart of FIG. 33.

It is assumed that the oscillation signal s41 is detected the differential sense lines 81 and 71 are selected simultaneously. In this situation, both the selection signals s31 and s32 are "0", and the selection signal s33 is "0" or "1". When the selection signal s33 is "0", the address is A or D. When the selection signal s33 is "1", the address is B or C. Subsequently, the sense line 85 and the differential sense line 71 are selected. In this situation, the selection signals s31 and s32 are "0" and "4", respectively, and the selection signal s33 is "0" or "1". Regardless of the signal s33 being "0" or "4", unless the oscillation signal s41 is detected, the address where the coordinate indicator 5 exists is A or C. In the case where the selection signal s33 is "0" and the oscillation signal s41 is detected, the address where the coordinate indicator 5 exists is B. In the case where the selection signal s33 is "1" and the oscillation signal s41 is detected, the address where the coordinate indicator 5 exists is D. The addresses A and C can be determined in accordance with the selection signal s33 supplied to the phase change-over circuit 11b when a plurality of the initial differential sense lines are selected simultaneously. If the selection signal s33 is "1", the detected address is C, whereas, if the selection signal s33 is "0", the detected address is A.

In this embodiment, for example, the gain of the positive feedback loop is previously adjusted so that no oscillation signal s41 cannot be detected at the address D when the amplitude of the oscillation signal s41 is obtained at the address A.

Further, as in the first embodiment, as to the problem that the address at which the oscillation signal s41 is detected is mis-recognized by shifting the phase by 180 degrees with the extreme inclination of the coordinate indicator 5, the mis-recognition could be prevented by the method of investigating the oscillation signal s41 at the address which is defined by the sense lines each consisting of one loop adjacent to each other.

As described above, with the sense line thus selected, not only two addresses could be readily separated from each other but also mis-input of the coordinates could be prevented. The method of calculating the position can be realized by the method applied to the conventional position input apparatus, and is identical to that in the first embodiment, and therefore its description will be omitted.

From the above result, similarly in this embodiment, such a problem can be solved that the accuracy in calculation of the coordinates is lowered in the peripheral portion of the coordinate detector body 1i as described in association with the foregoing background portion. Also, the invalid region in the peripheral portion thereof can be reduced such that all of the distances d1 to d4 of the return portions at four sides of the sense lines shown in FIG. 30 are 5 mm or less, without any changes in an area of the coordinate detector body, thereby being capable of broadening the readable region.

In this embodiment, the oscillation signal s41 from the sense line 85 is not used for calculating the coordinates. This is because the loop configuration of the second sense line group is slightly different from that of other sense lines. In other words, because the oscillation signal s41 obtained from the sense line 85 is different in distribution from the oscillation signal s41 obtained from other sense lines of the second sense line group, it is used only for judging the approach of the resonance circuit 6 to the loop 81b of the differential sense line.

However, it is possible that a difference between the oscillation signal s41 of the sense line 85 and the oscillation signal s41 obtained by other second sense lines are previously obtained through experiment, and the oscillation signal s41 is corrected and used for calculation of the coordinates. Alternatively, it is possible that the loop configuration of the sense line 85 is previously made equal to that of other second sense lines, and used for calculation of the coordinates.

Now, a description will be given of some variations of the above-mentioned structure.

The signal processing circuit 3d is connected to the output of the amplifying circuit 11b in FIG. 30. However, as described above, the signal processing circuit 3d may be connected to another circuit on demand, so long as it can input the amplitude information on the oscillation signal s41. For example, the signal processing circuit 3d can be connected to the input of the amplifying circuit 11b. In this case, since the amplitude of the oscillation signal s41 is small, an amplifying circuit need be additionally disposed in front of the rectifying circuit 31 shown in FIG. 25.

In the structure shown in FIG. 30, the first sense line groups and the second sense line groups have 5 loop units, respectively. However, the number of sense lines may be designed so as to be arbitrarily increased or decreased in accordance with the position calculation range. The present invention, without limiting to the detectable range, can be put into a practice in a wide range of from a position input apparatus which is called a compact tablet to a position input apparatus which is called a large-sized digitizer.

Moreover, in FIG. 30, the first and second sense line groups have one differential sense line consisting of two loops the loop directions of which are opposite to each other, respectively. However, all of the first and second sense line groups may be comprised of differential sense lines, and the present invention does not depend on the number of the differential sense lines.

Further, in FIG. 30, the number of sense lines for separation of the addresses is 1, however, any number of sense lines can be placed. The object of the present invention is to discriminate two addresses by selection of a plurality of differential sense lines. Hence, the location of the differential sense line may not be at the right end shown in FIG. 30, but may be in any direction of the upper and lower or the right and left. Also, the differential sense line may not be in only one direction but may be placed in both the x- and y-directions. The size and length of the loop are not limited to the width and length of the loop of the second sense line as described above, but can be freely placed, taking the direct electromagnetic coupling between the sense lines orthogonal to each other into account.

Further, in FIG. 30, the phase change-over circuit is connected to the input of the amplifying circuit. However, it goes without saying that the phase change-over circuit is fundamentally to change the phase by 180 degrees, and can be connected to the output side of the amplifying circuit.

Still further, in FIG. 30, the distances d1 to d4 of the return portions of the sense lines are 5 mm or less. However, this distance is not limited to 5 mm. It is apparent that, even though the distances are more than 5 mm, it is effective even to a case where the direct electromagnetic coupling occurs between the sense lines.

Figure 34:
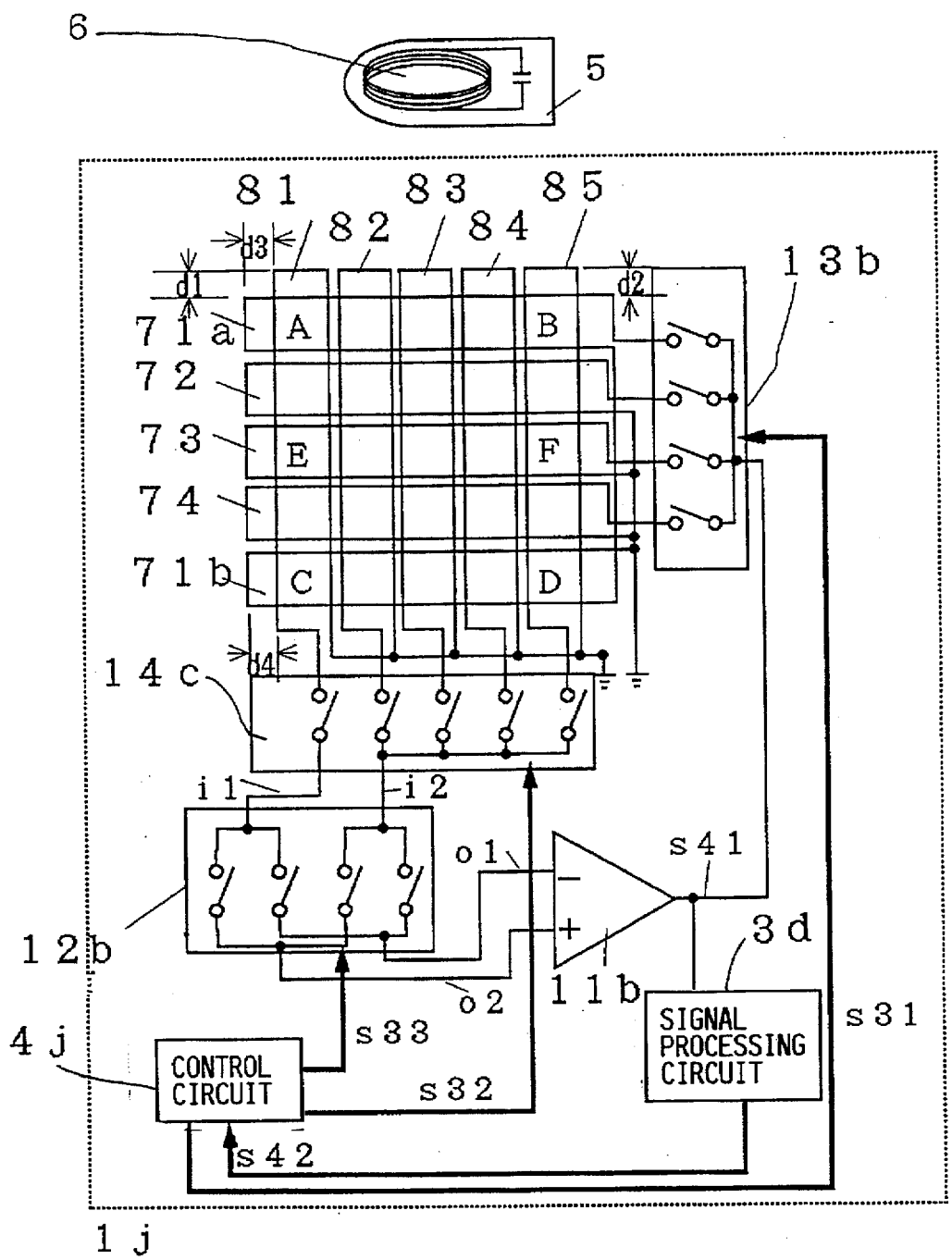
FIG. 34 is a structural diagram showing a coordinate reader with a seventh structure in accordance with the fifth embodiment of the present invention.

Subsequently, a fifth embodiment of the present invention will be described with reference to FIGS. 34 to 37. FIG. 34 is a structural diagram showing a coordinate reader with a seventh structure in accordance with the present invention.

In this embodiment, the sense lines 81 and 85 of the second sense line groups 81 to 84, the second scanning circuit 14c, and the phase change-over circuit 12b are different from the structure of the foregoing fourth embodiment. Other structure is identical to that of the fourth embodiment.

The first sense line groups 71 to 74 are comprised of a differential sense line 71 having two loops 71a and 71b connected in series, the loop directions of which are opposite to each other, and sense lines 72 to 74 each consisting of one loop. The second sense line groups 81 to 85 are comprised of sense lines 81 to 85 each consisting of one loop, all the loop directions of which are equal to each other as shown in the figure. The distances d1 to d4 of the return portions of the first and second sense line groups which are placed orthogonally to each other are equal to each other and 5 mm or less.

The first scanning circuit 13b and the second scanning circuit 14c are comprised of a plurality of electronic switch elements such as analog switches, respectively, and one terminals of the respective switch elements except for a switch connected with the sense line 81 are connected to each other to provide a common terminal every scanning circuit. In detail, an analog switch IC, CD4051, an FET 2SK1581 and the like can be used for that circuit. One of the switch elements in each of the scanning circuits is closed in response to the selection signals s31 and s32 given from the control circuit 4i to be described later, so that one ends of the switch elements except for the switch connected with the sense line 81 are connected to the common terminal. There is a case where the second scanning circuit 14c allows two sense lines to be connected to each other simultaneously in response to the selection signal s32.

The common terminal of the first scanning circuit 13b is connected to the output of the amplifying circuit 6. The common terminal i2 of the second scanning circuit 14c and one end i1 of the switch connected to the sense line 81 are connected to the phase change-over circuit 12b.

The functions of these circuits is shown in tables of FIG. 35 and will be described in detail. Those tables are one example for description, and their functions are not limited to or by only those tables.

The phase change-over circuit 12b is arranged to form a positive feedback loop when a resonance circuit exists with respect to all the combinations of the sense lines. The structure of the phase change-over circuit 12b is of a switch of 2-inputs to 2-outputs so that each of the input terminals is alternately switchably connected to the corresponding output terminals. In this example, the above function is realized by the cross-connection. The arrangement of the circuit depends on the elements used, and therefore the invention is not limited to or by that circuit. The function of that circuit is shown in FIG. 36.

In the phase change-over circuit 12b of FIG. 34, references i1 and i2 denote input terminals, and o1 and o2 are output terminals.

An output of the phase change-over circuit 12b is connected to the plus input and minus input of the amplifying circuit 11b. The amplifying circuit 11b is an amplifying circuit which is differentially inputtable with a plus (+) input and a minus (−) input.

The relationship between the phase and the loop of the sense line in this embodiment will be described below. In the second sense line groups 81 to 85, all the directions of loops are equal to each other. In the first sense line groups 71 to 74, the direction of loops except for the loops 71b of the differential sense line 71 is equal to each other. A closed loop is formed by the first sense line groups 71 to 74, the resonance circuit 6, the second sense line groups 81 to 85, and the amplifying circuit 11b before being oscillated. In this situation, if oscillation occurs when the second sense line groups 81 to 85 are connected to the minus (−) input of the amplifying circuit 11b by use of the first sense line groups 71 to 74 except for the loop 71b, the loop 71b allows a closed loop to be formed and oscillated when the second sense line groups 81 to 85 are connected to the plus (+) input of the amplifying circuit 11b.

The signal processing circuit 3d allows the oscillation signals s41 generated in the positive feedback loop to be rectified, smoothed and A/D converted, thereby outputting the amplitude information on the oscillation signal s41 corresponding to the position indicated by the coordinate indicator 5 as a digital value to the control circuit 4j.

The control circuit 4j is connected so as to supply the respective selection signals s31 to s33 to the first scanning circuit 13b, the second scanning circuit 14c and the phase change-over circuit 12b, respectively. The control circuit 4j calculates the coordinates indicated by the coordinate indicator 5 in accordance with the respective selection signals and the digital signal s42 of the amplitude information.

Subsequently, a description will be given of an operation of the coordinate reader with the above structure.

A concrete example of the operation of the sense line selection will be described. Shown in FIG. 37 are signals s31 to s33, selected sense lines, and a circuit connected to those selected sense lines when the addresses A, B, C, D, E and F are selected as the representative addresses shown in FIG. 34.

The description of FIG. 37 will be made below. Symbol "−" represents no connection. The sense lines are represented by only reference numbers.

In the case of the address A, 71 is connected through the first scanning circuit 13b, 81 is connected through the second scanning circuit 14c, and i1 is connected through the phase change-over circuit 12b to o1. In the case of the address B, 71 is connected through the first scanning circuit 13b, 85 is connected through the second scanning circuit 14c, and i2 is connected through the phase change-over circuit 12b to o1. In the case of the address C, 71 is connected through the first scanning circuit 13b, 81 is connected through the second scanning circuit 14c, and i1 is connected through the phase change-over circuit 12b to o2. In the case of the address D, 71 is connected through the first scanning circuit 13b, B5 is connected through the second scanning circuit 14c, and i2 is connected through the phase change-over circuit 12b to o2. Although the addresses A, B, C and D are positioned in the peripheral portions of the coordinate reader body 1j, because the differential sense line 71 is selected from the first sense line groups 71 to 74, the direct electromagnetic coupling between the sense lines is canceled.

In the case of the address E, 73 is connected through the first scanning circuit 13b, 81 and 85 are connected through the second scanning circuit 14c, and i1 and i2 are connected to o1 and o2, respectively, through the phase change-over circuit 12b. In the case of the address F, 73 is connected through the first scanning circuit 13b, 81 and 85 are connected through the second scanning circuit 14c, and i1 and i2 are connected to o2 and o1, respectively, through the phase change-over circuit 12b. The addresses E and F are positioned in the peripheral portion of the coordinate reader body 1j and allow only the sense lines consisting of a single loop to be selected from the first and second sense line groups 71 to 74 and 81 to 85. However, because 81 and 85, which are selected by the second scanning circuit 14c, are connected through the phase change-over circuit 12b to the amplifying circuit 11b having the difference input simultaneously, the differential sense line is constituted by 81 and 85 through the amplifying circuit 11b. This effect makes the direct electromagnetic coupling between the first and second sense lines 72 and 81 canceled by the direct electromagnetic coupling between the first and second sense lines 72 and 85. For this reason, even in the addresses E and F, there is no direct electromagnetic coupling between the sense lines, thereby being capable of forming a positive feedback loop.

As is apparent from the above description, when the oscillation signal s41 is obtained in the respective states represented by the selection signals s31 to s33, the coordinate indicator 5 exists in the vicinity of the address represented by the selection signals s31 to s33.

Also, as in the first embodiment, as to the problem that the address at which the oscillation signal s41 is detected is mis-recognized by shifting the phase by 180 degrees with the extreme inclination of the coordinate indicator 5, the mis-recognition could be prevented by the method of investigating the oscillation signal s41 at the address which is defined by the sense lines each consisting of one loop adjacent to each other.

With the sense line thus selected, not only two addresses could be readily separated from each other but also mis-input of the coordinates could be prevented. The method of calculating the position can be realized by the method applied to the conventional position input apparatus, and is identical to that in the first embodiment, and therefore its description will be omitted.

From the above result, similarly in this embodiment, such a problem can be solved that the accuracy in calculation of the coordinates is lowered in the peripheral portion of the coordinate detector body 1j as described in association with the foregoing background portion. Also, the invalid region in the peripheral portion thereof can be reduced such that all of the distances d1 to d4 of the return portions at four sides of the sense lines shown in FIG. 34 are 5 mm or less, without any changes in an area of the coordinate detector body, thereby being capable of broadening the readable region.

Now, a description will be given of some variations of the above-mentioned structure.

The signal processing circuit 3d is connected to the output of the amplifying circuit 11b in FIG. 34. However, as described above, the signal processing circuit 3d may be connected to another circuit on demand, so long as it can input the amplitude information on the oscillation signal s41. For example, the signal processing circuit 3d can be connected to the input of the amplifying circuit 11b. In this case, since the amplitude of the oscillation signal s41 is small, an amplifying circuit need be additionally disposed in front of the rectifying circuit 31 shown in FIG. 25.

In the structure shown in FIG. 34, the first sense line groups and the second sense line groups have 5 loop units, respectively. However, the number of sense lines may be designed so as to be arbitrarily increased or decreased in accordance with the position calculation range. This principle, without limiting to the detectable range, can be put into a practice in a wide range of from a position input apparatus which is called a compact tablet to a position input apparatus which is called a large-sized digitizer. Moreover, in FIG. 34, the first sense line groups have one differential sense line having two loops connected in series, the loop directions of which are opposite to each other. However, all of the first sense line groups may be comprised of differential sense lines, and the present invention does not depend on the number of the differential sense lines. In such a case, it goes without saying that the system of scanning the sense line in the control circuit is changed.

Further, in FIG. 34, the phase change-over circuit is connected to the input of the amplifying circuit. However, it goes without saying that the phase change-over circuit is fundamentally to change the phase by 180 degrees, and can be connected to the output side of the amplifying circuit.

Still further, in FIG. 34, the distances d1 to d4 of the return portions of the sense lines are 5 mm or less. However, this distance is not limited to 5 mm. It is apparent that, even though the distances are more than 5 mm, it is effective even to a case where the direct electromagnetic coupling occurs between the sense lines.

Figure 38:
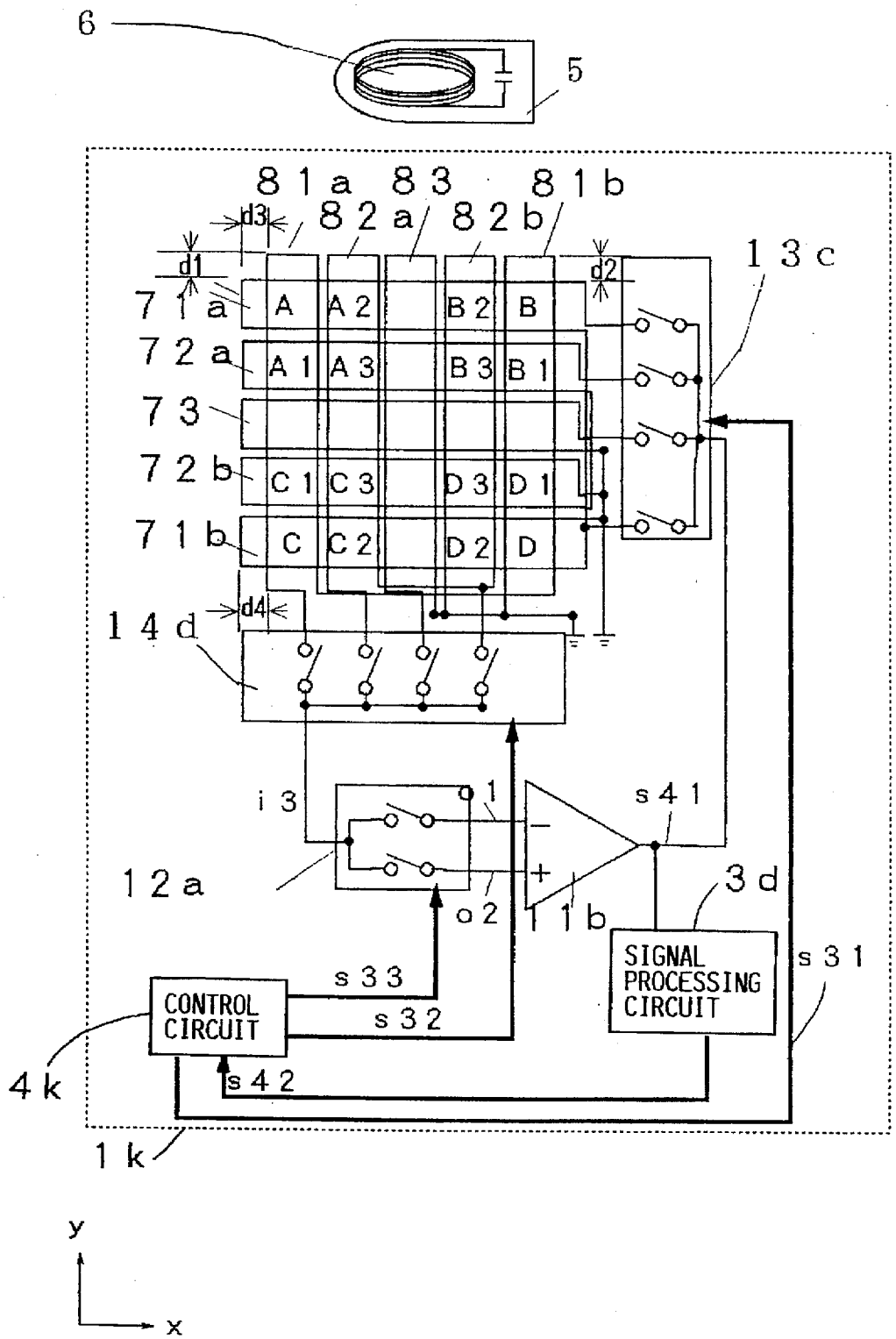
FIG. 38 is a structural diagram showing a coordinate reader with an eighth structure in accordance with the sixth embodiment of the present invention.
Figure 41A:
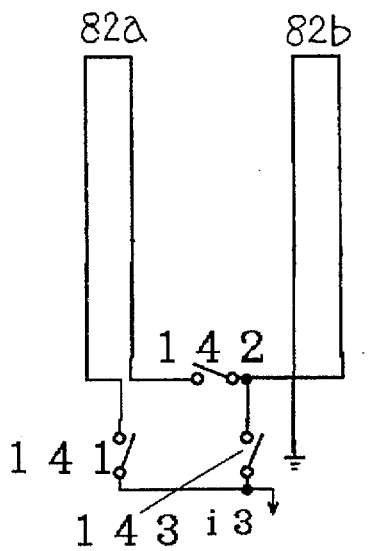
FIGS. 41A to 41D are diagrams showing differential sense lines as other examples of the eighth structure in the coordinate reader in accordance with the sixth embodiment of the present invention.
Figure 41B:
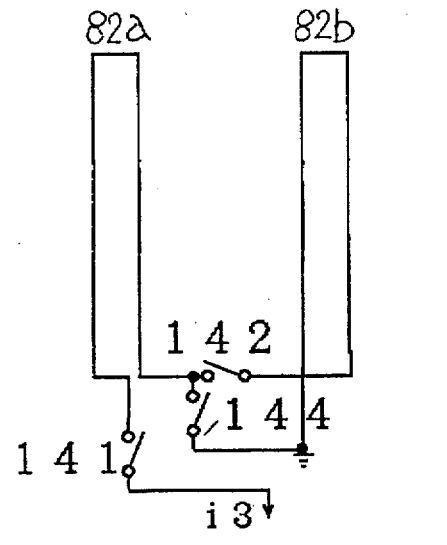
Figure 41C:
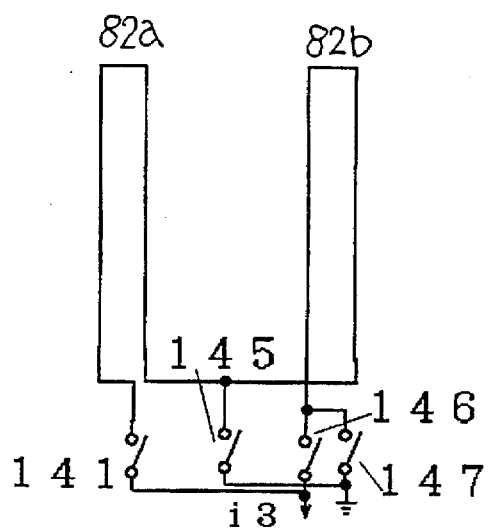
Figure 41D:
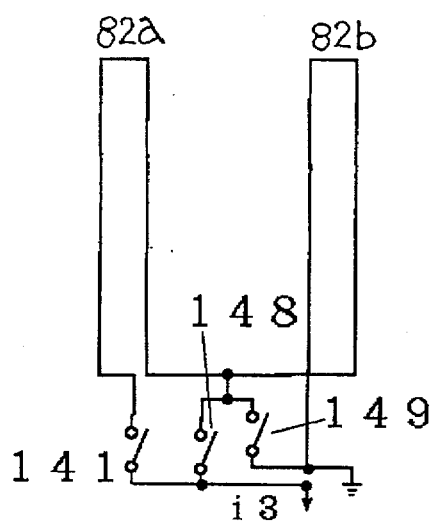

Subsequently, a sixth embodiment of the present invention will be described with reference to FIGS. 38 to 42. FIG. 38 is a structural diagram showing a coordinate reader with an eighth structure in accordance with the present invention.

In this embodiment, the first sense line groups 71 to 73 and the second sense line groups 81 to 83 are different from the structure of the foregoing fifth embodiment. The second scanning circuit 14d and the phase change-over circuit 12a are identical to those of the third embodiment.

The sense lines 71 and 72 are differential sense lines having the respective two loops 71a, 71b and 72a, 72b connected in series, respectively, the loop directions of which are opposite to each other. Likewise, the sense lines 81 and 82 are differential sense lines having the respective two loops 81a, 81b and 82a, 82b connected in series, respectively, the loop directions of which are opposite to each other. The loops 71a and 72a have the same loop direction as that of the loop 73. The loops 81a and 82a have the same loop direction as that of the loop 83. Switches are provided between the respective two loops of the differential sense lines 71 and 82, for selecting only one loops 71b and 82b, respectively.

The object of the switches connected between two loops of each differential sense line is to select only one loop of each differential sense line, and therefore the provision of those switches are not limited to only this embodiment. For example, a description will be given of an example of the differential sense line B2 shown in FIGS. 41A to 41D. In an example of FIG. 41A, as in this embodiment, the coordinate reader is arranged so that the loop 82b can be selected and a switch 142 allows two loops to be disconnected. In an example of FIG. 41B, the coordinate reader is arranged so that a switch 144 allows a loop 82a to be grounded so as to select the loop 82a. The switch 142 is used for disconnecting the loop 82b. In an example of FIG. 41C, it is arranged so that a switch 145 allows the middle of two loops to be grounded so as to select both the loops 82a and 82b. In an example of FIG. 41D, two switches are disposed in the middle of two loops so that the loop 82b is selected by a switch 148 whereas the loop 82a is selected by a switch 149. The arrangements of FIGS. 41C and 41D in which two loops of the differential sense line can be selected independently are more effective to the separation of two addresses as well as the prevention of mis-recognition. Although FIGS. 41A to 41D show the examples of the differential sense line 82, it goes without saying that the present invention is not limited to only the differential sense line 82.

The first and second scanning circuits 13c and 14d, as in the third embodiment, are comprised of a plurality of electronic switch elements such as analog switches, respectively, and one terminals of the respective switch elements are connected to each other to provide a common terminal. The number of switches in the first scanning circuit 13c is four. The number of switches in the second scanning circuit 14d, as in the first scanning circuit 13c, is four.

The functions of these circuits which are different from those of the third embodiment are shown in tables of FIGS. 39 and 40. These tables are one example for description, and the functions are not limited to or by only these tables. In the tables, only reference symbols are represented for the names of signals. In the first scanning circuit 13c, when the selection signal s31 is "3", only the loop 71b of the differential sense line 71 is selected. Similarly, in the second scanning circuit 14d, when the selection signal s32 is "3", only the loop 82b of the differential sense line 82 is selected.

The relationship between the phase and the loop of the sense line in this embodiment will be described below. In the first and second sense line groups 71 to 73 and 81 to 83, the directions of loops except for the loops 71b, 72b and 81b, 82b of the differential sense line in each sense line group are equal to each other. A closed loop is formed by the first sense line groups 71 to 73, the resonance circuit 6, the second sense line groups 81 to 83, and the amplifying circuit 11b. In this situation, if the second sense line 83 except for the differential sense lines 81 and 82 is connected to the minus (−) input of the amplifying circuit 11b whereas the first sense line 73 except for the differential sense lines 71 and 72 is connected to the output of the amplifying circuit 11b, when the resonance circuit 6 exists in the vicinity of these sense lines, the closed loop is formed and oscillated. When the differential sense line 81 or 82 is connected to the minus (−) input of the amplifying circuit 11b, and the differential sense line 71 or 72 is connected to the output of the amplifying circuit 11b, the closed loop is formed and oscillated if the resonance circuit 6 exists in the vicinity of the address A defined by the loops 71a and 81a and the address D defined by the loops 71b and 81b, the address A1 defined by the loops 72a and 81a and the address D1 defined by the loops 72b and 81b, the address A2 defined by the loops 71a and 82a and the address D2 defined by the loops 71b and 82b, or the address A3 defined by the loops 72a and 82a and the address D3 defined by the loops 72b and 82b.

When the differential sense line 81 or 82 is connected to the plus (+) input of the amplifying circuit 11b, and the differential sense line 71 or 72 is connected to the output of the amplifying circuit 11b, the closed loop is formed and oscillated if the resonance circuit 6 exists in the vicinity of the address B defined by the loops 71a and 81b and the address C defined by the loops 71b and 81a, the address B1 defined by the loops 72a and 81b and the address C1 defined by the loops 72b and 81a, the address B2 defined by the loops 71a and 82b and the address C2 defined by the loops 71b and 82a, or the address B3 defined by the loops 72a and 82b and the address C3 defined by the loops 72b and 82c. In other words, the paired addresses A and D, A1 and D1, A2 and D2, A3 and D3, B and C, B1 and C1, B2 and C2, and B3 and C3 are selected similarly, and these paired addresses are not separated, respectively.

However, because the loop 71b of the differential sense line 71 and the loop 82b of the differential sense line 82 can be selected as a single loop, if the condition for inputting to the amplifying circuit 11b when the foregoing differential sense line is selected is made identical to each other and the loop 71b is selected, the addresses C, C2, D and D2 are arranged so that the addresses B2, B3, D2 and D3 can be selected independently by selecting the loop 82b.

Similarly, since the differential sense line is used in this embodiment, as in the first embodiment, there arises the problem that an address at which the oscillation signal s41 is detected is mis-recognized due to the shift of the phase by 180 degrees which is caused by the extreme inclination of the coordinate indicator 5. However, with the foregoing structure of the sense lines, mis-recognition can be prevented without any dependency on the method applied to the first to fourth embodiments.

Subsequently, a description will be given of the operation of executing the separation of two addresses and the prevention of the mis-recognition simultaneously. Shown in FIG. 42 is a flowchart of the operation of detecting the oscillation signal s41, for example, when the differential sense lines 71 and 82 are selected and the differential sense line 82 is connected to the minus (−) input of the amplifying circuit 11b, in accordance with this embodiment.

First, when the differential sense lines 71 and 83 are selected and the differential sense line 82 is negatively inputted to the amplifying circuit 11b, the selection signals s31, s32 and s33 are "0", "1" and "0", respectively. In this situation, if the oscillation signal s41 is obtained, there is a high possibility that the coordinate indicator 5 exists in the vicinity of the address A2 or D2.

Since the oscillation signal s41 was detected, the loop 71b of the differential sense line 71 and the differential sense line 82 are selected. The selection signal s33 is not changed. In this situation, the selection signals s31, s32 and s33 are "3", "1" and "0", respectively. If the oscillation signal s41 is detected, it can be presumed that the coordinate indicator 5 exists in the vicinity of the address D2. Unless the oscillation signal s41 is detected, it can be presumed that the coordinate indicator 5 exists in the vicinity of the address A2.

In order to recognize this presumption, the differential sense line 71 and the loop 82b of the differential sense line 82 are selected. The signal s33 is not changed. In this situation, the selection signals s31, s32 and s33 are "0", "3" and "0", respectively. In this situation, if the present oscillation signal s41 is detected and the previous oscillation signal s41 is also detected, it can be determined that the coordinate indicator 5 exists in the vicinity of the address D2. However, if the present oscillation signal s41 is detected but the previous oscillation signal s41 is not detected, it cannot be determined that the coordinate indicator 5 exists in the vicinity of the address D2, resulting in invalidity.

If the present oscillation signal s41 is not detected and the previous oscillation signal s41 is not detected, it is determined that the coordinate indicator 5 exists in the vicinity of the address A2. However, if the present oscillation signal s41 is not detected and the previous oscillation signal s41 is detected, it cannot be determined that the coordinate indicator 5 exists in the vicinity of the address A2, resulting in invalidity.

FIG. 42 shows the discriminating method only when the selection signal s33 is "0". However, even in the case where the selection signal s33 is "1", that is, the oscillation signal s41 is detected when the address B2 or C2 is selected, the discrimination of mis-recognition and the distinction of two addresses are facilitated by alternately selecting only one loop of the differential sense line through the first and second scanning circuits 13c and 14d.

In this embodiment, the gain of the positive feedback loop is previously adjusted, for example, so that the oscillation signal s41, which is not of phase at the address D2, is not detected when the amplitude of the oscillation signal s41 is obtained at the address A2.

With the sense line thus selected, the respective paired addresses A2, D2 and B2, C2 could be separated. The separation of two addresses except for the above pairs, that is, the separation of the addresses A and D, A1 and D1, A3 and D3, B and C, B1 and C1, and B3 and C3 can be discriminated as follows:

When the differential sense line 72 and the loop 82b of the differential sense line 82 are selected, if the oscillation signal s41 is detected, the coordinate indicator 5 exists at the address B3 or D3. If the oscillation signal s41 is not detected, the coordinate indicator 5 exists at the address C3 or A3. Therefore, the discrimination of the addresses A3 and D3, or the addresses B3 and C3 is enabled. Also, when the loop 71b of the differential sense line 71 and the differential sense line 81 are selected, if the oscillation signal s41 is detected, the coordinate indicator 5 exists at the address C or D. If the oscillation signal s41 is not detected, the coordinate indicator 5 exists at the address B or A. Therefore, the discrimination of the addresses A and D, or the addresses B and C is enabled.

Further, for the discrimination of the addresses A1 and D1, or the addresses B1 and C1, the information on the addresses adjacent to the respective addresses is used. In other words, the addresses can be discriminated by the presence or absence of the oscillation signal s41 at the addresses D3 and D adjacent to the address D1, at the addresses A3 and A adjacent to the address A1, at the addresses C3 and C adjacent to the address C1, at the addresses B3 and B adjacent to the address B1, with respect to the respective addresses D1, A1, C1 and B1.

With the sense line thus selected, two addresses can be readily separated, and mis-input can be prevented.

From the above results, similarly in this embodiment, such a problem can be solved that the accuracy in calculation of the coordinates is lowered in the peripheral portion of the coordinate detector body 1k as described in association with the foregoing background portion. Also, the invalid region in the peripheral portion thereof can be reduced such that all of the distances d1 to d4 of the return portions at four sides of the sense lines shown in FIG. 34 are 5 mm or less, without any changes in an area of the coordinate detector body, thereby being capable of broadening the readable region.

In this embodiment, the oscillation signal s41 from one loops 71b and 82b of the differential sense lines 71 and 82 is not used for calculation of the coordinates. However, the oscillation signal s41 can be used for calculation of the coordinates. The operation of the signal processing circuit 3d and the control circuit 4k is the same as that in the foregoing embodiments. The method of calculating the coordinates can be realized by the method applied to the conventional position input apparatus, and is identical to that in the first embodiment, and therefore its description will be omitted.

Now, a description will be given of some variations of the above-mentioned structure.

The signal processing circuit 3d is connected to the output of the amplifying circuit 11b in FIG. 38. However, as described above, the signal processing circuit 3d may be connected to another circuit on demand, so long as it can input the amplitude information on the oscillation signal s41. For example, the signal processing circuit 3d can be connected to the input of the amplifying circuit 11b. In this case, since the amplitude of the oscillation signal s41 is small, an amplifying circuit need be additionally disposed in front of the rectifying circuit 31 shown in FIG. 25.

In the structure shown in FIG. 38, the first sense line groups and the second sense line groups have 5 loop units, respectively. However, the number of sense lines may be designed so as to be arbitrarily increased or decreased in accordance with the position calculation range. This principle, without limiting to the detectable range, can be put into a practice in a wide range of from a position input apparatus which is called a compact tablet to a position input apparatus which is called a large-sized digitizer.

Moreover, in FIG. 38, the first and second sense line groups have two differential sense lines each having two loops connected in series, the loop directions of which are opposite to each other. However, all of the first and second sense line groups may be comprised of differential sense lines, and the present invention does not depend on the number of the differential sense lines.

Also, in FIG. 38, the first and second sense line groups have one differential sense line having a switch between two loops the loop directions of which are opposite to each other, respectively. However, such a switch can be provided for all the differential sense lines. For the purposes of effectively executing the distinction of two addresses as well as the prevention of mis-recognition simultaneously, it is preferable to reduce the number of switches.

The number of the differential sense lines each having a switch between two loops thereof, and the position of location thereof are determined in accordance with the distances of the return portion of the sense line, the configuration of the coordinate indicator, the scanning method for the coordinate reader, the coordinate calculating method, the height or inclination of the coordinate indicator in use, or the like. In any case, the present invention can be applied to such conditions.

Further, in FIG. 38, the phase change-over circuit is connected to the input of the amplifying circuit. However, it goes without saying that the phase change-over circuit is fundamentally to change the phase by 180 degrees and can be connected to the output side of the amplifying circuit.

Still further, in FIG. 38, the distances d1 to d4 of the return portions of the sense lines are 5 mm or less. However, this distance is not limited to 5 mm. It is apparent that, even though the distances are more than 5 mm, it is effective even to a case where the direct electromagnetic coupling occurs between the sense lines.

In the foregoing pages, the first to sixth embodiments have been described. First, in the second to sixth embodiments, it is important that the sense lines are so placed as to reduce the mutual inductance between the sense lines in the peripheral portion of the coordinate reader so that no direct electromagnetic coupling occurs. The length, width and winding number of the sense lines including the sense line consisting of two loops, and the intervals at which the sense lines are placed are not particularly limited.

Furthermore, in the foregoing fourth structure and the second embodiment, the phase change-over circuit is used. However, any means may be used, so long as it can switches the phase between the inverse state and the non-inverse state. For example, the phase can be changed over by switching the phase between the inverse state and the non-inverse state through an amplifying circuit.

In the coordinate reader with the third to eighth structures, the coordinate reader body is equipped with an AGC circuit for controlling the amplification degree of the amplifying circuit so that the information on the position indicated by the coordinate indicator is obtained from the amplitude information of the oscillation signal obtained from the input signal to said amplifying circuit or the control signal outputted from said AGC circuit.

In the foregoing first to eighth structures, and the first to sixth embodiments, the resonance circuit within the coordinate indicator consists of a coil and a capacitor. Instead, a state setting means may be provided at the coordinate indicator side, and a state detecting means for detecting that state may be provided at the coordinate detector body. For example, at least one structure in which a switch and a capacitor are connected in series is equipped within the coordinate indicator, or an element having an inductance, capacitance, impedance or the like which is changeable in accordance with the state such as pressure which effects the coordinate indicator is equipped within the coordinate indicator, whereby the resonance frequency of said resonance circuit can be changed by the on/off operation of the switch in the former, or by the pressing force in the latter. The change of the resonance frequency is detected by the signal processing circuit or phase detecting circuit at the coordinate detector body side, thereby detecting the state of the coordinate indicator. Alternatively, the coordinate detector is provided with means for detecting an induction signal which changes in accordance with the inclination or height of the coordinate indicator to detect the state of the coordinate indicator.

Further, in the first embodiment, 4 excitation lines and 4 detection lines are used, whereas in the second embodiment, the number of the first and second sense lines are 8 in total. However the number of the excitation lines, the detection lines and the sense lines including the excitation line, the detection line and the sense line each consisting of two loops can be arbitrarily increased or decreased depending on the detectable range. Hence, the present invention, without limiting to the detectable range, can be put into a practice in a wide range of from a position input apparatus which is called a compact tablet to a position input apparatus which is called a large-sized digitizer.

As was described above, according to the present invention, because the induction signal component or the oscillation signal component resulting from the direct electromagnetic coupling between the excitation line and the detection line or between the sense lines, which causes the deterioration of the accuracy in calculation of the coordinates, can be made zero, there can be provided the coordinate reader which calculates the coordinates with accuracy even in the peripheral portion thereof with the coordinate detector body being not so large-sized.

What is claimed is:

1. A coordinate reader comprising: a coordinate detector body including at least one excitation line which is in the form of a loop and placed in parallel with one axis of x,y orthogonal coordinate axes, at least one detection line which is in the form of a loop and placed in parallel with the other axis of the x,y orthogonal coordinate axes, at least one of said excitation line and said detection line including at least one differential sense line having first and second loops connected in series and having directions which are opposite to one another, exciting means connected to said excitation line for supplying an excitation signal, signal processing means connected to said detection line for receiving an induction signal induced in the detection line, and control means connected to said signal processing means for receiving a signal outputted by the signal processing means; a coordinate indicator including a resonance circuit, the coordinate reader obtaining position information indicated by said coordinate indicator from the induction signal induced in said detection line; and phase detecting means for detecting a phase difference between the excitation signal and the induction signal to judge whether the coordinate indicator approaches the first loop or the second loop.

2. A coordinate reader, comprising:

a coordinate detector body including an excitation line group formed by a plurality of excitation lines which is in the form of a loop and placed in parallel with one axis of x, y orthogonal coordinate axes, at least one of which is a differential sense line having first and second loops connected in series, the directions of which are opposite to each other; a detection line group formed by a plurality of detection lines which is in the form of a loop and placed in parallel with the other axis of x, y orthogonal coordinate axes, at least one of which is a differential sense line having first and second loops connected in series, the directions of which are opposite to each other; an excitation line scanning means connected to said excitation line group for selecting one excitation line from said excitation line group; a detection line scanning means connected to said detection line group for selecting one detection line from said detection line group; an exciting means for supplying an excitation signal to said excitation lines through said excitation line scanning means; a signal processing means coupled to said detection lines through said detection line scanning means; a control means connected to said signal processing means; and a phase detecting means for detecting a phase difference between said excitation signal and a signal generated in said detection line; and a coordinate indicator including a resonance circuit.

3. A coordinate reader, comprising: a coordinate detector body including an amplifying circuit, a first sense line connected to an output of said amplifying circuit and placed in parallel with one axis of XY orthogonal coordinate axes in the form of a loop, a second sense line connected to an input of said amplifying circuit and placed in parallel with the other axis of said XY orthogonal coordinate axes in the form of a loop, a signal processing means, and a control means; and a coordinate indicator including a resonance circuit; wherein at least one of said first sense line and said second sense line includes a differential sense line having first and second loops connected in series, the directions of which are opposite to each other; and wherein, when said resonance circuit approaches said first and second sense lines so as to be electromagnetically coupled with said first and second sense lines, said amplifying circuit, said first and second sense lines, and said resonance circuit form an oscillating circuit of a positive feedback loop to generate an oscillation signal, and said signal processing means processes said oscillation signal to be converted into amplitude information, so that position information indicated by said coordinate indicator is obtained from said amplitude information through said control means.

4. A coordinate reader as claimed in claim 3; further comprising phase change-over means provided to an output or input of said amplifying circuit for inverting a phase of said oscillation signal to judge whether said coordinate indicator approaches said first loop or said second loop.

5. A coordinate reader, comprising:

a coordinate detector body including a first sense line group formed by a plurality of sense lines which is in the form of a loop and placed in parallel with one axis of XY orthogonal coordinate axes, at least one of which is a differential sense line having first and second loops connected in series, the directions of which are opposite to each other; a second sense line group formed by a plurality of sense lines which is in the form of a loop and placed in parallel with the other axis of XY orthogonal coordinate axes, at least one of which is a differential sense line having first and second loops connected in series, the directions of which are opposite to each other; a first scanning means connected to said first sense line group for selecting one sense line from said first sense line group; a second scanning means connected to said second sense line group for selecting one sense line from said second sense line group; an amplifying circuit having an input and output connected to said first scanning means and said second scanning means, respectively; a signal processing means connected to the input or output of said amplifying circuit; a control means connected to said signal processing means; and a phase change-over means connected to the output or input of said amplifying circuit for changing over the phase of an input signal according to a signal from said control means; and a coordinate indicator including a resonance circuit.

6. A coordinate reader as claimed in claim 5; wherein said first sense line group or said second sense line group includes two differential sense lines adjacent to each other, and the other sense line group includes one differential sense line.

7. A method of detecting coordinates for use in the coordinate reader as claimed in claim 5, in which the respective sense lines selected by said first and second scanning means, said amplifying circuit and said resonance circuit form an oscillating circuit of a positive feedback loop, and when the maximum oscillation signal is generated, two candidatures are obtained as address candidatures determined by the selected sense lines, said method comprising the steps of:

(1) one sense line of said first and second sense line groups is an address determined by a sense line which is not a differential sense line, an oscillation signal at an address adjacent to a first candidature address is detected, and when said oscillation signal detected is significant, said first candidature address is the address indicated by said coordinate indicator;

(2) when said oscillation signal detected is not significant, one sense line of said first and second sense line groups is an address determined by a sense line which is not a differential sense line, an oscillation signal at an address adjacent to a second candidature address is detected, and when said oscillation signal detected is significant, said second candidature address is the address indicated by said coordinate indicator; and (3) when the oscillation signal in said steps (1) and (2) is not significant, said first and second candidature addresses are made invalid.

8. A coordinate reader as claimed in claim 5; wherein at least one of said first and second sense line groups is provided with a discrimination sense line for discriminating said one loop of said differential sense line in the vicinity of one loop region of at least one differential sense line.

9. A method of detecting coordinates for use in the coordinate reader as claimed in claim 8, in which the respective sense lines selected by said first and second scanning means, said amplifying circuit and said resonance circuit form an oscillating circuit of a positive feedback loop, and when the maximum oscillation signal is generated, four candidatures are obtained as address candidatures determined by the selected sense lines, said method comprising the steps of:

classifying said four candidatures into first and second candidature groups in accordance with a control signal supplied to said phase change-over means when said maximum oscillation signal is obtained;

selecting said discrimination sense line and a differential sense line of the sense line group having no discrimination sense line, and detecting the presence or absence of the oscillation signal at that time; and specifying the address indicated by said coordinate indicator in accordance with the presence or absence of said oscillation signal, and specifying information on whether the candidature is classified into said first or second group in accordance with the control signal supplied to said phase change-over means when the oscillation signal is obtained at this step.

10. A coordinate reader, comprising:

a coordinate detector body including a first sense line group formed by a plurality of sense lines which is in the form of a loop and placed in parallel with one axis of XY orthogonal coordinate axes; a second sense line group formed by a plurality of sense lines which is in the form of a loop and placed in parallel with the other axis of XY orthogonal coordinate axes, at least one of which is a differential sense line having first and second loops connected in series, the directions of which are opposite to each other; a first scanning means connected to said first sense line group for selecting one sense line from said first sense line group, or said one sense line and one sense line from the remainder simultaneously; a second scanning means connected to said second sense line group for selecting one sense line from said second sense line group; an amplifying circuit having an inverse input terminal and a non-inverse input terminal, the amplifying circuit having inputs and an output coupled to said first scanning means and said second scanning means, respectively; a signal processing means connected to the input or output of said amplifying circuit; a control means connected to said signal processing means; and a phase change-over means for controlling to which of the inverse input terminal and non-inverse input terminal of said amplifying circuit one or two sense lines selected by said first scanning means are inputted; and a coordinate indicator including a resonance circuit.

11. A coordinate reader, comprising:

a coordinate detector body including a first sense line group formed by a plurality of sense lines which is in the form of a loop and placed in parallel with one axis of XY orthogonal coordinate axes, at least one of which is a differential sense line having first and second loops connected in series, the directions of which are opposite to each other; a second sense line group formed by a plurality of sense lines which is in the form of a loop and placed in parallel with the other axis of XY orthogonal coordinate axes, at least one of which is a differential sense line having first and second loops connected in series, the directions of which are opposite to each other; a first scanning means connected to said first sense line group for selecting one sense line or loop from the respective sense lines of said first sense line group and one loop of the differential sense line of said first sense line group; a second scanning means connected to said second sense line group for selecting one sense line or loop from the respective sense lines of said second sense line group and one loop of the differential sense line of said second sense line group; an amplifying circuit having an output and input coupled to said first scanning means and said second scanning means, respectively; a signal processing means connected to the input or output of said amplifying circuit; a control means connected to said signal processing means; and a phase change-over means connected to the output or input of said amplifying circuit for changing over the phase of an input signal according to a signal from said control means; and a coordinate indicator including a resonance circuit.

12. A coordinate reader as claimed in claim 11; wherein said first and second scanning means select the middle point of said first and second loop of at least one differential sense line to select one loop of the respective differential sense lines of said first and second sense line groups, respectively.

13. A coordinate reader as claimed in claim 11; wherein said first and second loops of at least one of said respective differential sense lines of said first and second sense line groups is electrically disconnected or connected to each other, and said first and second scanning means select one loop of said respective differential sense lines, independently, or both loops of said differential sense lines.

14. A coordinate reader comprising:
   a coordinate detector body having at least one excitation line, at least one detection line, an exciting circuit connected to the excitation line for supplying an exciting signal, a signal processing circuit connected to the detection line for receiving an induction signal generated in the detection line and outputting a signal containing amplitude information of the induction signal, and a control circuit for receiving the signal outputted by the signal processing unit and outputting an excitation control signal to the exciting circuit;
   a coordinate indicator for indicating position information obtained from the induction signal induced in the detection line; and
   a phase detecting circuit for detecting a phase difference between the excitation signal and the induction signal generated in the detection line.

15. A coordinate reader as claimed in claim 14; wherein the excitation line comprises a first loop; and wherein the detection line comprises a second loop disposed in orthogonal relation to the first loop.

16. A coordinate reader as claimed in claim 14; wherein at least one of the excitation line and the detection line includes at least one differential sense line having first and second loops connected in series; and wherein the phase detecting circuit detects a phase difference between the excitation signal and the induction signal generated in the detection line to judge whether the coordinate indicator approaches the first loop or the second loop of the differential sense line.

17. A coordinate reader as claimed in claim 16; wherein the directions of the first and second loops of the differential sense line are opposite to one another.

* * * * *